United States Patent [19]
Minoura et al.

[11] Patent Number: 5,627,670
[45] Date of Patent: May 6, 1997

[54] SCANNING OPTICAL APPARATUS HAVING BEAM SCAN CONTROLLER

[75] Inventors: Kazuo Minoura, Yokohama; Isamu Shimoda; Masayuki Suzuki, both of Zama; Yoshinobu Shiraiwa, Machida; Osamu Hoshino, Ebina, all of Japan

[73] Assignee: Canon Kabushiki Kaisha, Tokyo, Japan

[21] Appl. No.: 476,047

[22] Filed: Jun. 7, 1995

Related U.S. Application Data

[63] Continuation of Ser. No. 139,058, Oct. 21, 1993, abandoned, which is a continuation of Ser. No. 547,206, Jul. 3, 1990, abandoned.

[30] Foreign Application Priority Data

| Jul. 5, 1989 | [JP] | Japan | 1-173395 |
| Aug. 2, 1989 | [JP] | Japan | 1-201985 |
| Aug. 4, 1989 | [JP] | Japan | 1-202384 |
| Aug. 4, 1989 | [JP] | Japan | 1-202385 |

[51] Int. Cl.⁶ .................... G02B 26/10; G03G 15/04
[52] U.S. Cl. .................... 359/212; 359/216; 250/235; 369/44.14
[58] Field of Search .................... 369/44.11, 93, 369/97; 359/216–221, 205, 207, 215, 212, 210; 250/235, 236, 234, 201.2, 201.4, 201.8; 358/480, 481, 496, 474; 347/258–261

[56] References Cited

U.S. PATENT DOCUMENTS

| 4,314,154 | 2/1982 | Minoura et al. | 350/6.7 |
| 4,390,235 | 6/1983 | Minoura | 350/6.6 |
| 4,816,844 | 3/1989 | Uchida et al. | 346/160 |
| 4,829,175 | 5/1989 | Goto et al. | 359/218 |
| 4,903,067 | 2/1990 | Murayama et al. | 346/160 |
| 4,908,511 | 3/1990 | Ishikawa et al. | 359/212 |
| 4,949,100 | 8/1990 | Hidaka | 369/44.11 |
| 4,990,771 | 2/1991 | Minoura | 350/6.8 |
| 5,018,808 | 5/1991 | Meyers et al. | 359/221 |
| 5,109,297 | 4/1992 | Izumi | 359/216 |

FOREIGN PATENT DOCUMENTS

| 0056944 | 5/1977 | Japan | 359/219 |
| 52-028666 | 7/1977 | Japan . | |
| 55-074519 | 6/1980 | Japan . | |
| 59-015217 | 1/1984 | Japan . | |
| 59-116603 | 7/1984 | Japan . | |
| 0202431 | 11/1984 | Japan | 359/218 |
| 60-100113 | 6/1985 | Japan . | |
| 61-025367 | 2/1986 | Japan . | |
| 61-278814 | 4/1986 | Japan . | |
| 0067817 | 4/1986 | Japan | 359/218 |
| 61-190311 | 8/1986 | Japan . | |
| 62-81873 | 4/1987 | Japan . | |
| 62-225067 | 10/1987 | Japan . | |
| 63-078167 | 4/1988 | Japan . | |
| 2085580 | 4/1982 | United Kingdom . | |

*Primary Examiner*—Thang V. Tran
*Attorney, Agent, or Firm*—Fitzpatrick, Cella, Harper & Scinto

[57] ABSTRACT

A scanning optical apparatus comprises a light source unit, scanning means for deflecting a beam from said light source unit and scanning a scanning surface with the beam, means for detecting the beam scanned on said scanning surface and control means for controlling the beam scanned on said scanning surface in a direction perpendicular to said scanning surface on the basis of a magnitude and a change as a function of time of a signal output from said detecting means.

6 Claims, 18 Drawing Sheets

F I G. 16
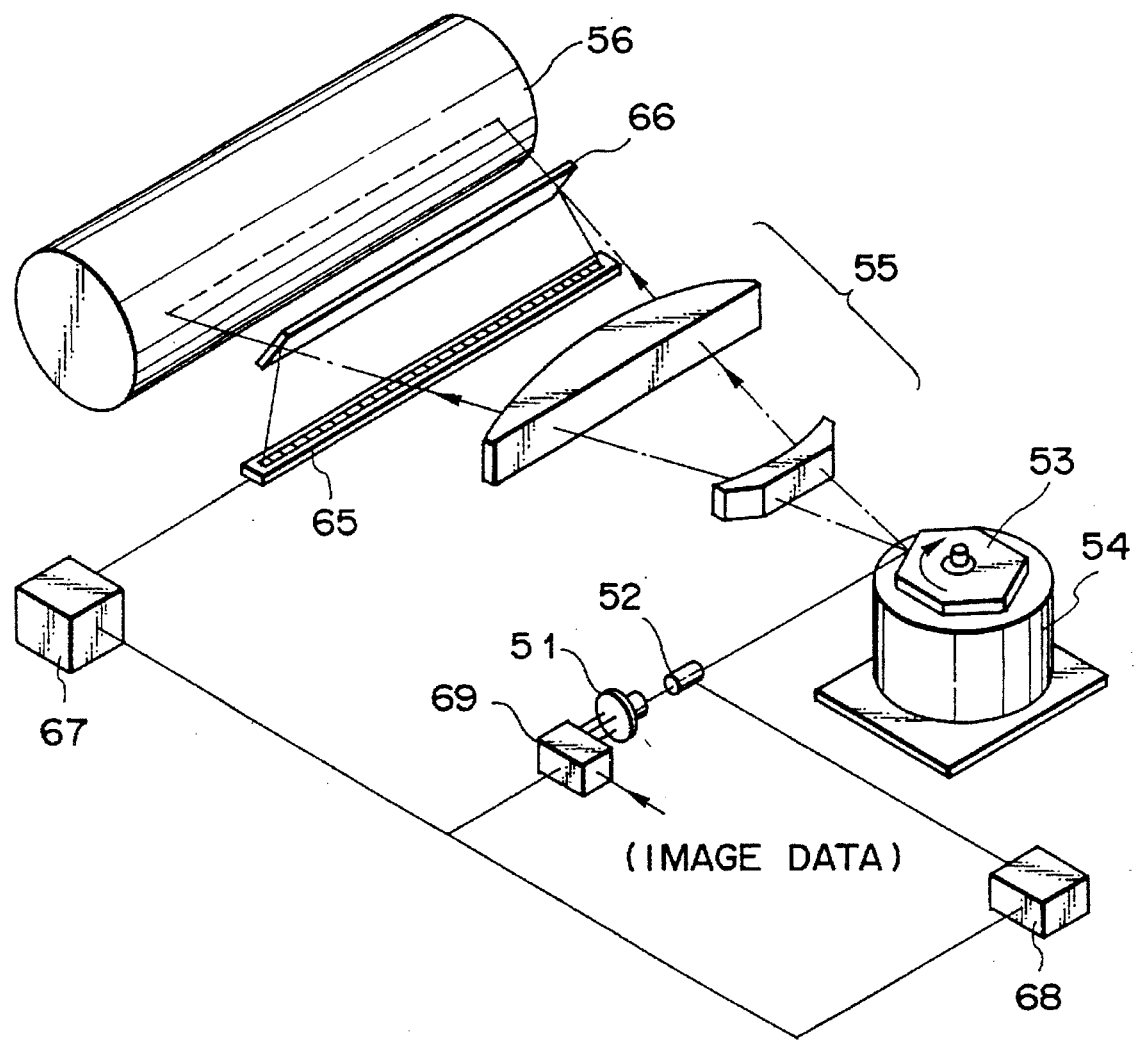

F I G. 17
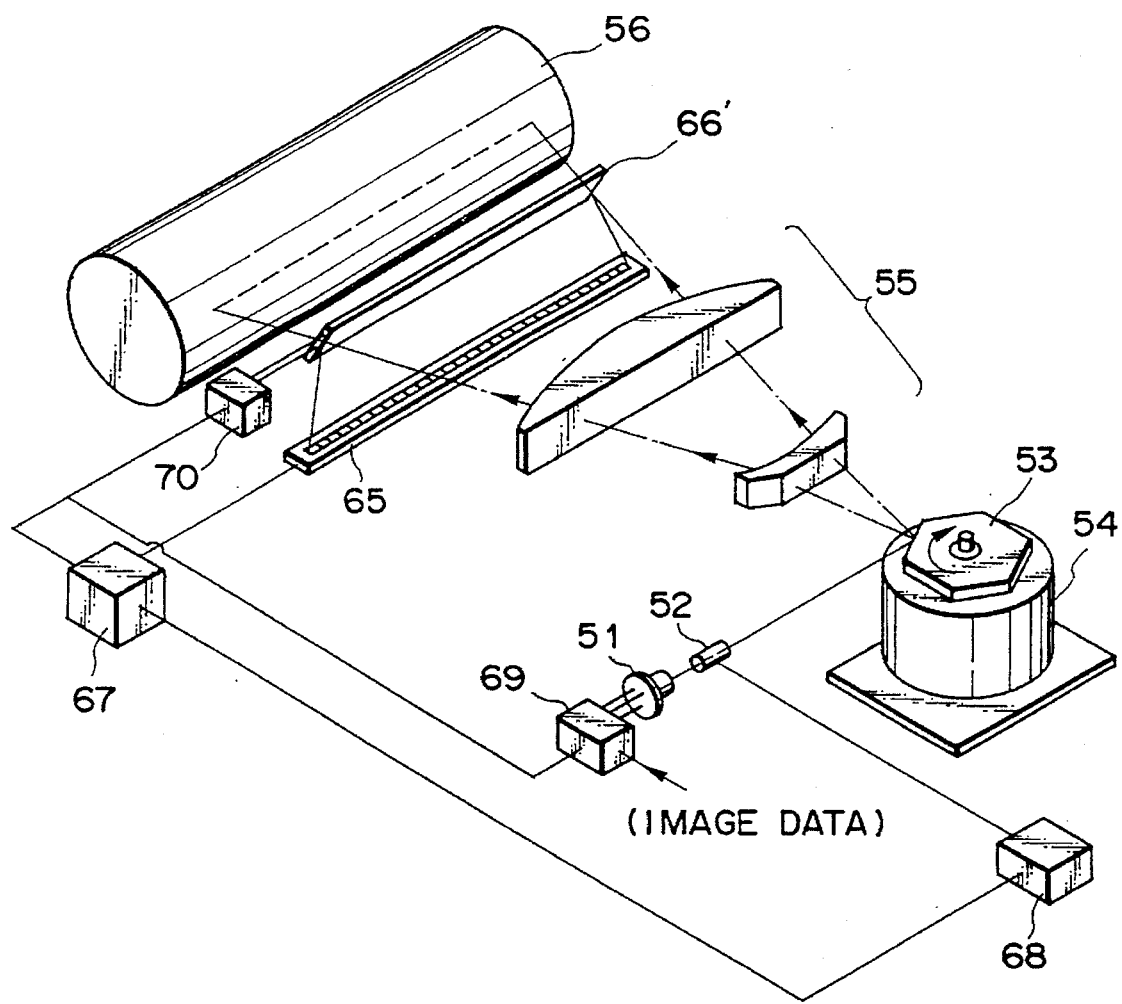

SCANNING OPTICAL APPARATUS HAVING BEAM SCAN CONTROLLER

This application is a continuation of application Ser. No. 08/139,058 filed Oct. 21, 1993, now abandoned, which is a continuation of application Ser. No. 07/547,206 filed Jul. 3, 1990, now abandoned.

BACKGROUND AND SUMMARY OF THE INVENTION

The present invention relates to a scanning optical apparatus for performing recording and reading of a high-precision fine image and, more particularly, to a scanning optical apparatus for detecting a focusing position of a beam spot in a direction perpendicular to a scanning surface formed by a scanning beam as a function of time.

In a conventional laser scanning apparatus, it is known to control movement of a light source or lens by an actuator (e.g., Japanese Laid-Open Patent Application No. 59-116603) to correct an error of a focusing position of a laser beam.

In a conventional optical disk memory system, it is also known to control a pickup lens so as to automatically focus a beam on an optical disk surface in an in-focus state (auto focus) or to automatically radiate a beam on a target track (auto tracking).

In the former prior art, in order to correct an error of a focusing position of a laser beam, when the light source or lens is controlled to be moved in an optical axis direction, the laser beam is deviated in a direction perpendicular to the scanning surface, and a positional error of the laser spot in this direction may occur.

When a rotary polygonal mirror or vibration mirror is used as a light deflector, a laser beam may be deviated in a direction perpendicular to the scanning surface due to a machining error of its deflection/reflecting surface or instability of a rotating shaft of the deflector.

In the latter prior art, i.e., in an optical disk memory, light information is recorded upon rotation of a recording medium, i.e., an optical disk. A light deflector is not used unlike in the above scanning optical system. In the optical disk memory, a positional relationship between a light source and a focusing point on the optical disk is basically kept unchanged. Auto focus (AF) and auto tracking are performed to cope with only variations (eccentricity and inclination) of the optical disk surface. Since these variations, however, are very small, it is not easy to apply the AF and AT techniques to the former prior art, i.e., the laser scanning optical system and to correct the positional error due to differences in arrangements.

In other words, the positional relationship between the light source and the focusing point on the surface of the recording medium such as a photosensitive body is changed over time with a cyclic movement of the light deflector, unlike in the optical disk memory system. Control must be concentrated on the positional error of the focusing point.

In a scanning optical apparatus for scanning and exposing a recording body surface with a light beam, in order to obtain a high-quality image, the focusing point of the light beam is preferably always located at a predetermined position from the surface of the recording body. However, the focusing position of the light beam does not always maintain a predetermined positional relationship due to aberration, thermal expansion, and the like.

For this reason, there is provided a system for maintaining the position of a focusing point at a predetermined position by driving the light source or a part of the optical system (e.g., Japanese Laid-Open Patent Application No. 63-78167).

Of a copying machine, a recording apparatus, and the like using laser beams, an apparatus using a rotary polygonal mirror may have irregular surface inclination of the polygonal mirror to cause feed pitch errors in scanning lines, and a high-quality image may not be obtained. In order to solve this problem, a system for correcting irregular inclination by a surface inclination correcting optical means is known (Japanese Patent Publication No. 52-28666).

The optical surface inclination correcting system has disadvantages in that scanning line feed pitch errors caused by irregular feeding of a recording body cannot be corrected, and that an optical system is complicated and expensive. For this reason, a non-optical surface inclination correcting system is also proposed (Japanese Laid-Open Patent Application No. 59-15217).

In a conventional scanning optical apparatus for scanning and exposing a recording body surface with a light beam, in order to maintain a scanning position of the light beam at a predetermined position on the recoding body surface, there is provided a method of driving a part of an optical system or a reflection mirror or the like arranged in part of an optical system (e.g., Japanese Laid-Open Patent Application Nos. 61-190311, 61-278814 and 59-15217).

At this time, information used to control part of the optical system is obtained from a means for detecting a feed error of a recording body or a means for storing surface inclination information for a polygonal mirror serving as a deflector (e.g., Japanese Laid-Open Patent Application Nos. 59-15217 and 61-190311).

A method of maintaining a focusing point of a light beam at a predetermined position from the surface of a recording body during exposure and scanning is a method of driving the light source or a part of the optical system (e.g., Japanese Laid-Open Patent Application No. 63-78167). At this time, information for controlling the part of the light source or optical system is information obtained by a photodetector arranged in part of the optical system or information stored in the storage means (e.g., Japanese Laid-Open Patent Application Nos. 60-100113 and 61-25367).

The following problems, however, are posed by the above conventional methods. For example, in control for maintaining the focusing position of the light beam or the scanning position at the predetermined position in accordance with information from the storage means, if focusing or scanning positional errors are caused by information except for that stored in the storage means, correction control cannot be performed.

When correction control is to be performed on the basis of information from the photodetector arranged in part of the optical system or the means for detecting irregular feeding, it is very difficult to perform correction control of focusing and scanning positional errors for all scanning lines due to structural limitations. At the same time, an operation from information detection to error correction must be performed almost in real time. This operation is very difficult when processing time and the like of an electronic circuit are also taken into consideration.

Japanese Laid-Open Patent Application No. 62-225067 proposes an optical scanning apparatus using two photodetectors constituting a means for detecting a change in scanning line position caused by a surface inclination error of a rotary polygonal mirror. These photodetectors are spaced apart from each other by a predetermined distance in a direction perpendicular to a scanning surface. Japanese Laid-Open Patent Application No. 55-74519 proposes an optical scanning apparatus for detecting a shift amount of a scanning light beam as follows. At the time of measurement of a shift of a scanning light beam, caused by a surface inclination error of a rotary polygonal mirror, a solid image pickup element array arranged in a shift measurement direction of the scanning light beam is arranged such that a plurality of solid image pickup elements are arranged at a very small pitch. These elements are irradiated with the scanning light beam, and the shift amount of the scanning light beam is detected by a distribution of outputs from the solid image pickup elements.

In the above prior art, since one detector is arranged within the scanning range of the scanning light beam, i.e., since one detector is used in the scanning direction of the light beam, it is impossible to perform correction control of scanning positional errors along the entire scanning line. In Japanese Laid-Open Patent Application No. 62-225067, a difference between light amounts received by the two photodetectors is used as surface inclination information of a rotary polygonal mirror. In Japanese Laid-Open Patent Application No. 55-74519, a correspondence between a scanning light beam and the order of an ON element of a solid image pickup element array is detected, and the detection information is used as surface inclination information of the rotary polygonal mirror. For this reason, when the scanning direction of the scanning lines is not inclined from a scanning direction (ideal scanning direction) at the time of recording or reading and is vertically shifted to be parallel thereto, correction of the scanning line position can be performed. However, when the scanning direction of the scanning line is inclined from the scanning direction (ideal scanning direction) of recording or reading and is vertically shifted not to be parallel thereto, correction of the scanning line is impossible.

It is, therefore, an object of the present invention to provide a scanning optical apparatus which can appropriately control a positional error of a beam spot on a scanning surface so as to solve the conventional problems described above.

In order to achieve the above object of the present invention, there is provided a scanning optical apparatus comprising means for detecting a scanning positional error of a beam spot on a scanning surface such as an original or a photosensitive body in a direction perpendicular to the scanning surface of the light beam, the original being recorded with character image information, and means for controlling movement of the beam spot in the direction perpendicular to the scanning direction, wherein the control means controls movement of the spot position so as to always scan the beam spot in a predetermined mode in accordance with the magnitude and a change as a function of time of a signal from the detecting means.

The means for detecting the scanning position of the beam spot on the scanning surface further has a function of detecting a focal point or focusing position of a beam within the scanning surface of the beam. In this case, a positional error of the beam spot in the direction perpendicular to the scanning surface and a positional error of a beam waist in a direction perpendicular to the direction of beam scanning within the scanning surface can be independently corrected.

BRIEF DESCRIPTION OF THE DRAWINGS

FIG. 16 is a perspective view of a scanning optical apparatus according to the fifth embodiment of the present invention;

FIG. 17 is a perspective view of a scanning optical apparatus according to the sixth embodiment of the present invention;

DESCRIPTION OF THE PREFERRED EMBODIMENTS

Figure 1:
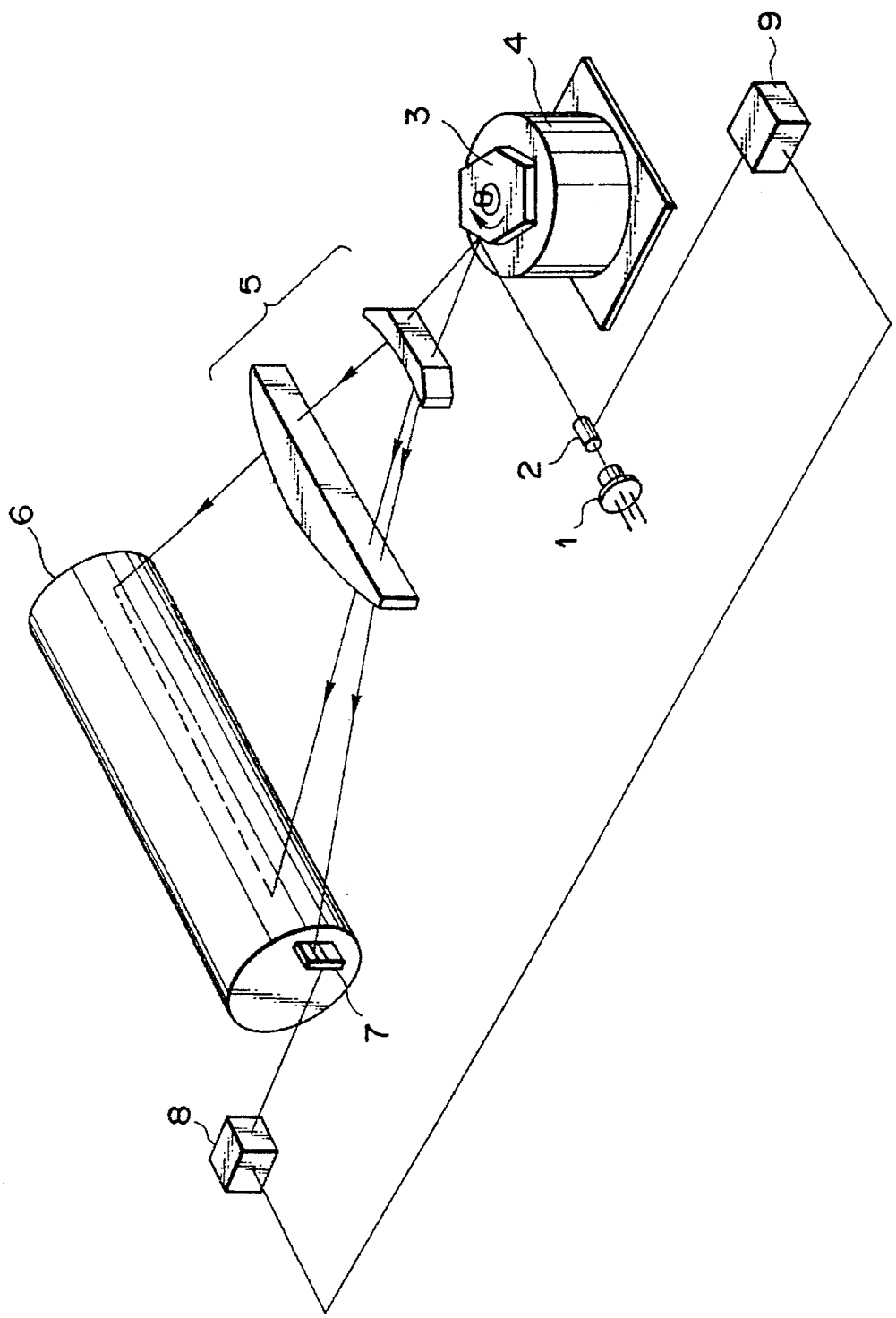
FIG. 1 is a schematic perspective view of a scanning optical apparatus according to the first embodiment of the present invention.

FIG. 1 shows a scanning optical apparatus according to the first embodiment of the present invention. The scanning optical apparatus comprises a light source unit 1 constituted by a semiconductor laser and a collimator lens, a spot position control system 2, a rotary polygonal mirror 3, a motor 4 for driving the polygonal mirror 3, a scanning lens system 5, a photosensitive drum 6, a spot position detector 7, a detection signal processing circuit 8 for processing electrical signals from the spot position detector 7, and a control circuit 9 for supplying a control signal to the spot position control system 2 in accordance with a signal output from the detection signal processing circuit 8.

Figure 2:
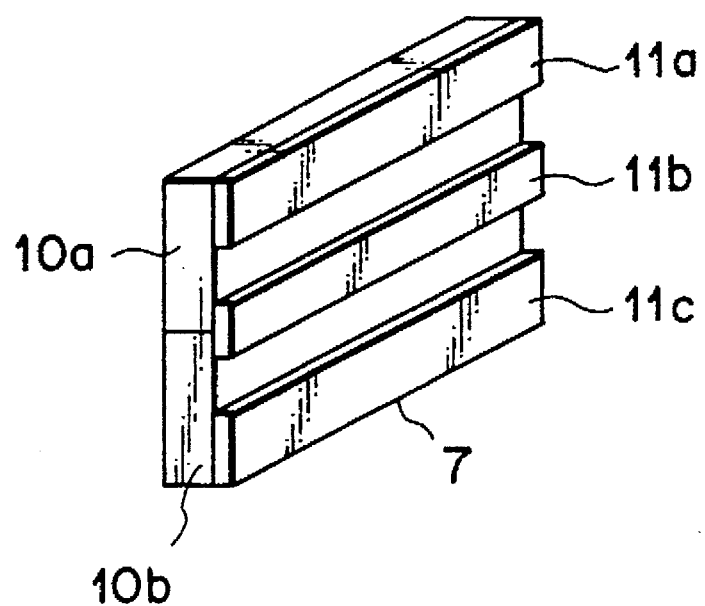
FIG. 2 is a detailed perspective view of a spot position detector.
Figure 3:
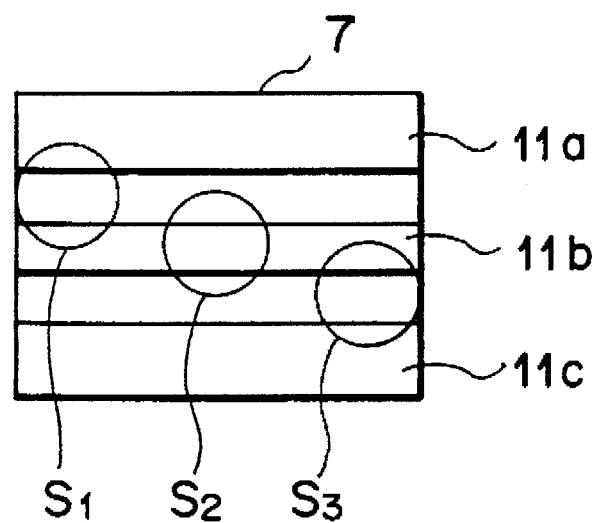
FIG. 3 is a view for explaining detection of a positional error by the spot position detector.

FIG. 2 shows a basic structure of the spot position detector 7. The spot position detector 7 comprises independent photoelectric transducers 10a and 10b, and light-shielding plates 11a, 11b, and 11c. The light-shielding plates 11a, 11b, and 11c extend in a direction to scan a laser spot, so that slit-like openings each having a predetermined width in a direction (sub scanning direction) perpendicular to the scanning direction are defined between the photoelectric transducers 10a and 10b and the light-shielding plates 11a, 11b, and 11c. FIG. 3 shows a front view of the spot position detector 7. Laser spots S1, S2, and S3 are formed on the detector 7.

Detection of errors of the scanning direction and scanning position of the laser spot by the spot position detector 7 will be described below.

Figure 4:
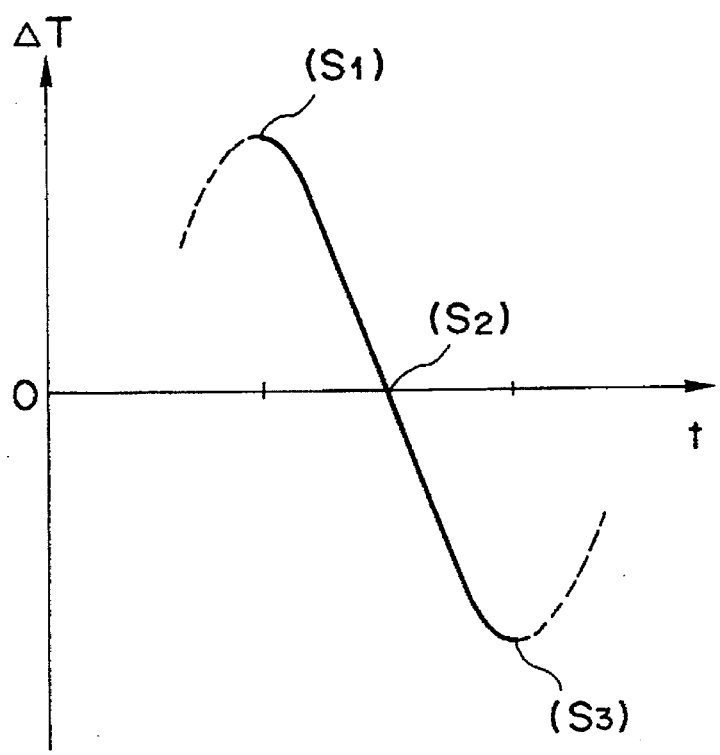
FIG. 4 is a graph for explaining a positional error signal.

FIG. 4 shows a change in difference $\Delta I$ ($\equiv Ia-Ib$) between electrical outputs Ia and Ib from the photoelectric transducers 10a and 10b as a function of time so as to correspond to changes in positions S1, S2, and S3 of the laser spot shown in FIG. 3. When the difference $\Delta I=0$, then electrical outputs from the photoelectric transducers 10a and 10b are equal to each other and correspond to a state wherein the laser spot is located at the position S2 in FIG. 3. When the laser spot is obliquely scanned from the upper left position to the lower right position, as indicated in FIG. 3, the difference $\Delta I$ is changed, as indicated in FIG. 4 and is detected. Predetermined scanning continues such that the position S2 in FIG. 3 is changed from the left to the right. The control circuit 9 is controlled such that the difference $\Delta I$ based on the outputs from the spot position detector 7 is always set to be zero. The scanning direction is corrected in this manner, and a predetermined spot position can be scanned. That is, the error of the scanning direction is determined upon detection of a time change of signals output from the photoelectric transducers.

In the above detection, the spot position control system 2 has various spot position control modes. For example, a cylindrical lens having a power in only the main or sub scanning direction is moved in an optical axis direction.

With the above arrangement, in spot position control, an operation for controlling a desired spot position is completed before the photosensitive drum 6 is scanned with a laser spot. The spot position control system 2 is then held at a desired spot position.

Figure 5:
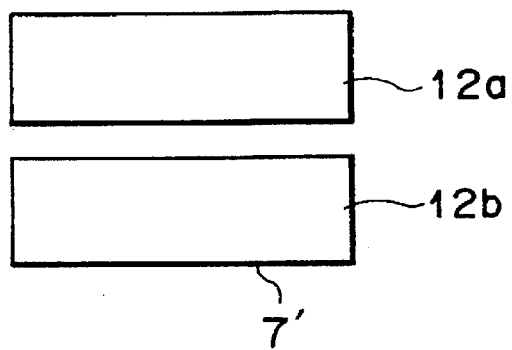
FIG. 5 is a view showing a modification of the spot position detector.

FIG. 5 shows a detector 7' which can replace the spot position detector 7 used in the above embodiment. The detector 7' does not use light-shielding plates but is divided into two parts in a direction perpendicular to the scanning direction of the laser spot. More specifically, the detector 7' comprises a pair of photoelectric transducers 12a and 12b extending in the scanning direction. When a spot position is displaced on the detector 7', as shown in FIG. 3, a difference $\Delta I$ is changed, as indicated in FIG. 4, and spot position control can be performed in the same manner as described above.

Figure 6:
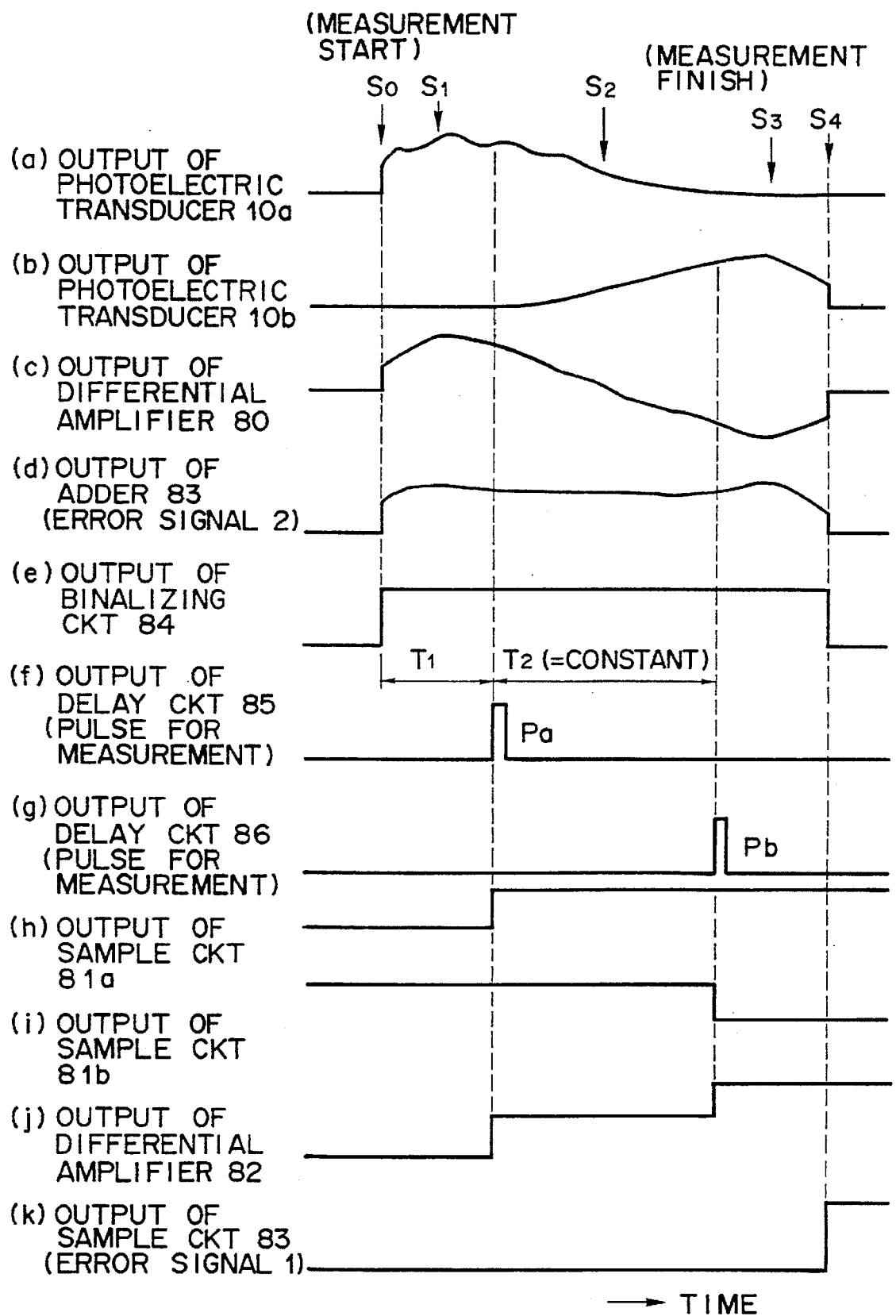
FIGS. 6(a) to 6(k) are timing charts of a signal processing system.
Figure 7:
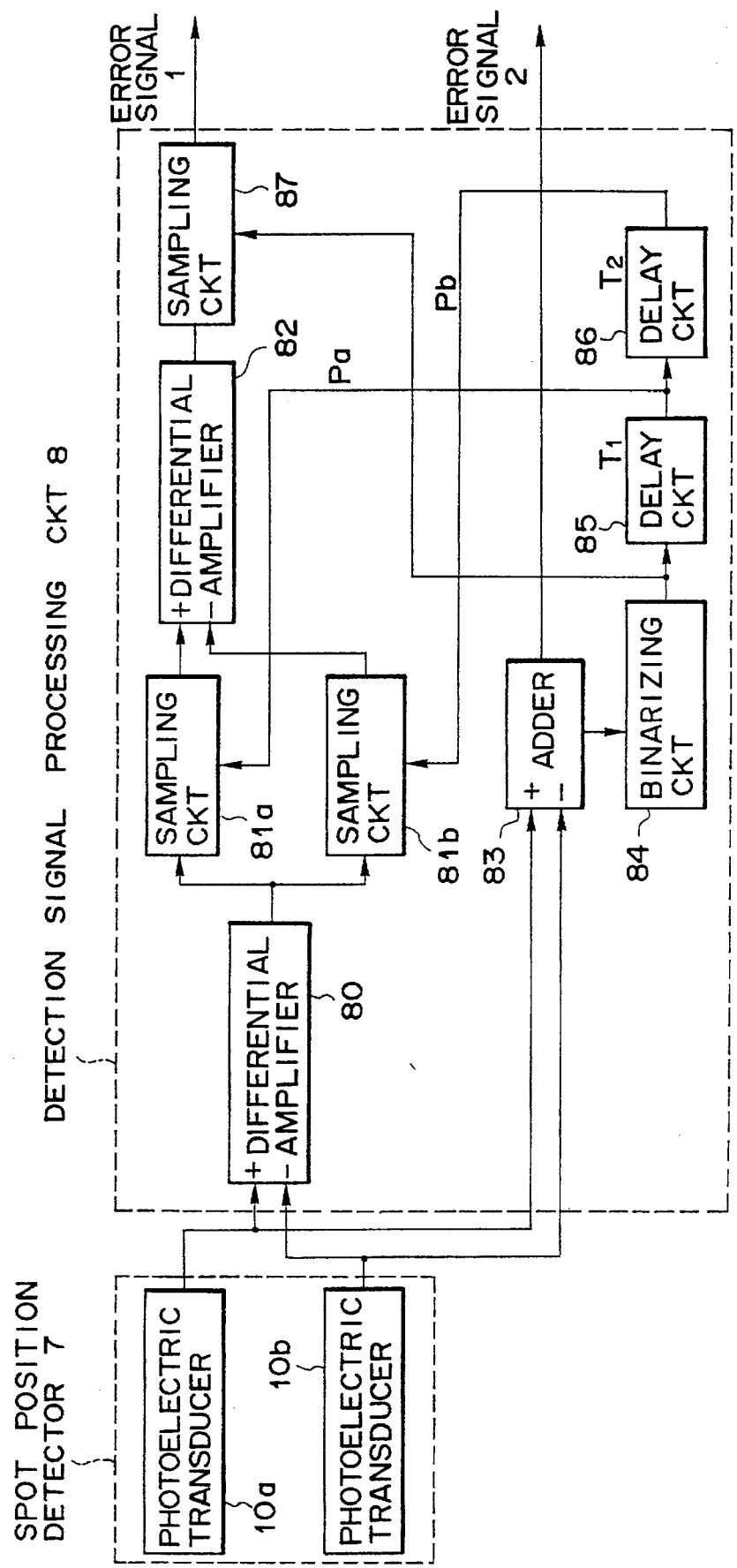
FIG. 7 is a block diagram of the signal processing system.

Spot position control of the first embodiment will be described in detail with reference to FIG. 6 showing a timing chart of the signal processing system of the first embodiment and FIG. 7 showing a block diagram of this signal processing system.

Assume that a laser spot to be scanned is radiated on the spot position detector 7, as shown in FIG. 3, and that the laser spot is scanned from the left to the right. Under these assumptions, outputs from the photoelectric transducers 10a and 10b of the spot position detector 7 change as a function of time, as indicated in FIGS. 6(a) and 6(b). A point S0 is a point at which the laser spot is initially radiated on the spot position detector 7. The point S0 is defined as the measurement start point. A point S4 is a point at which the laser beam is radiated on the spot position detector 7 last. The point S4 is defined as the measurement end point.

As shown in FIG. 3, when the laser spot is obliquely scanned, an output from the photoelectric transducer 10a rises from the point S0, becomes maximum near a point S1, and then is reduced. However, an output from the photoelectric transducer 10b is gradually increased after the point S0, becomes maximum near a point S3, and falls at the point S4.

FIG. 3 shows a state wherein a laser spot to be scanned is inclined downward to the right with respect to the predetermined scanning direction. Assume that the laser spot to be scanned is further inclined downward to the right. The points S1 and S3 at which the outputs from the photoelectric transducers 10a and 10b become maximum come near the central point S2. In this case, when a difference (FIG. 6(c)) between outputs from the photoelectric transducers 10a and 10b is taken into consideration, a gradient near the central point S2 is also increased. To the contrary, when the inclination of the laser spot with respect to the predetermined scanning direction is small, a difference between the outputs from the photoelectric transducers 10a and 10b near the point S2 is reduced.

Under the above circumstances, two points near the central point S2 are selected to measure a difference between outputs from the photoelectric transducers 10a and 10b.

When the scanning direction of the laser spot is not inclined with the scanning direction of recording and is vertically parallel thereto, either the photoelectric transducer 10a or 10b generates an output. A shift direction can be detected in accordance with a sum (FIG. 6(a)) of outputs from the photoelectric transducers 10a and 10b. The shift direction can be detected by directly measuring the magnitudes of the outputs from the photoelectric transducers 10a and 10b. If no difference is detected, the laser spot is shielded by the light-shielding plate 11b, and the output sum becomes zero. Therefore, an arrangement is implemented to allow measurement of the sum of outputs from the photoelectric transducers 10a and 10b. That is, when the magnitudes of signals output from the photoelectric transducers are measured, an upward or downward shift direction can be determined.

For this purpose, the detection signal processing circuit 8 is arranged, as shown in a block diagram of FIG. 7.

Outputs from the photoelectric transducers 10a and 10b are connected to a differential amplifier 80 and an adder 83. The differential amplifier 80 outputs a difference between the outputs from the photoelectric transducers 10a and 10b. An output from the differential amplifier 80 is connected to sampling circuits 81a and 81b.

An output from the adder 83 is an arithmetic sum of the outputs from the photoelectric transducers 10a and 10b, as shown in FIG. 6(a). The output from the adder 83 is binarized by a binarizing circuit 84 in accordance with an appropriately selected threshold level (FIG. 6(e)), and the binary signal is extracted together with an error signal 2. The error signal 2 depends on a vertical error of the laser spot.

An output from the binarizing circuit 84 is set at high level from the measuring start point S0 to the measurement end point S4, as indicated in FIG. 6(e). The output from the binarizing circuit 84 is input to a sampling circuit 87 and a delay circuit 85. The delay circuit 85 is triggered in response to a leading edge of the output from the binarizing circuit 84. After a lapse of a time interval T1, the delay circuit 85 outputs a measurement pulse Pa (FIG. 6(f)). The measurement pulse Pa is connected to the sampling circuit 81a and a delay circuit 86. The sampling circuit 81a samples and holds the output from the photoelectric transducer 10a in response to the measurement pulse Pa (FIG. 6(h)).

The delay circuit 86 is triggered in response to its input, i.e., the measurement pulse Pa. After a lapse of a time interval T2, the delay circuit 86 outputs a measurement pulse Pb (FIG. 6(g)). The measurement pulse Pb is connected to the sampling circuit 81b. The sampling circuit 81b samples and holds the output from the photoelectric transducer 10b in accordance with the measurement pulse Pb (FIG. 6(i)).

The delay time intervals T1 and T2 are set such that the measurement pulses Pa and Pb are generated at timings having the central point S2 as the center. As is apparent from FIGS. 6(a) to 6(i), a variation in delay time interval T2 does not directly cause an error. Therefore, the delay time interval T2 must be kept stable during the measurement.

The outputs from the sampling circuits 81a and 81b are input to a differential amplifier 82. An output from the differential amplifier 82 is a difference between outputs from the sampling circuits 81a and 81b, as shown in FIG. 6(j). The output from the differential amplifier 82 is connected to the sampling circuit 87. The sampling circuit 87 samples and holds the output from the differential amplifier 82 at a trailing edge of the output from the binarizing circuit 84 (FIG. 6(k)). Sampling of the sampling circuit 87 can be performed any time after generation of the measurement pulse Pb.

As can be apparent from the above description, the output from the sampling circuit 87 represents a degree of inclination of the central portion of the output from the differential amplifier 80. Therefore, the degree of inclination of the laser spot with respect to the predetermined scanning direction can be determined. The output from the sampling circuit 87 is called an error signal 1. The error signal 1 together with the error signal 2 and the outputs from the photoelectric transducers 10a and 10b are input to the control circuit 9 for generating the control signal.

The upward or downward shift direction of the laser spot with respect to the ideal scanning direction (using the error signal 2 and the outputs from the photoelectric transducers 10a and 10b) and a degree of inclination of the scanning direction with respect to the ideal predetermined scanning direction are detected (from the error signal 1). The control circuit 9 drives the spot position control system 2 on the basis of these detection signals.

Adjustment of an in-focus state of a laser spot will be exemplified by the spot position detector shown in FIG. 2.

Figure 8:
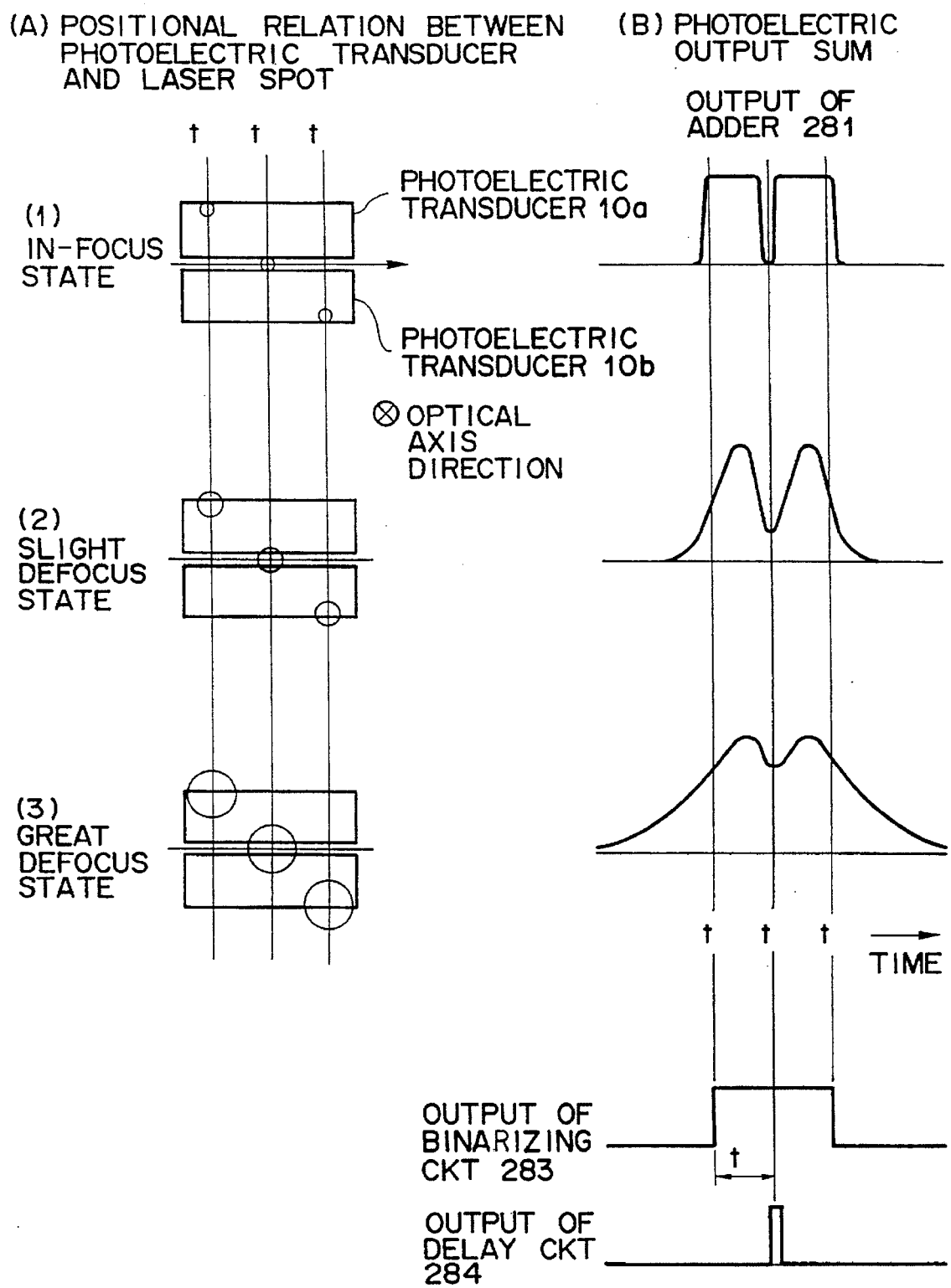
FIGS. 8(A) and 8(B) are views for explaining in-focus adjustment of a spot.

During propagation of a laser beam reflected by the rotary polygonal mirror 3 to the detector 7, the rotary polygonal mirror 3 is stopped to cause the spot position control system 2 to scan a laser spot in a laser spot recording scanning direction and a direction perpendicular to the optical axis direction. The optical axis direction in FIG. 8 is a direction perpendicular to a drawing surface, and the recording scanning direction is a right-and-left direction. A laser beam is vertically scanned from the upper position to the lower position on the drawing surface at a predetermined speed. At this time, time at which the photoelectric transducer 10a starts to be irradiated with a laser spot is defined as t1, time at which the laser beam comes to an intermediate position between the photoelectric transducers 10a and 10b is defined as t2, and time at which the photoelectric transducer 10b finishes to be irradiated with the laser spot is defined as t3. Vertical scanning in the vertical direction within the drawing surface is performed in the horizontal direction in FIGS. 8(A) and 8(B). The laser beam is scanned from the upper position to the lower position vertically although the laser spot looks as if it is obliquely scanned in FIG. 8(A).

FIG. 8(A)-(1) shows an in-focus state in which a laser spot is focused on the photoelectric transducers 10a and 10b, i.e., the photoelectric drum 6. In this case, the diameter of the laser spot is minimum. A sum of the outputs from the photoelectric transducers 10a and 10b is shown in FIG. 8(B). According to the characteristic phenomenon in the in-focus state, when the laser spot is located almost between the photoelectric transducers 10a and 10b, the beam spot is shielded by the light-shielding plate 11b, and an output sum is almost zero.

FIG. 8(A)-(2) shows a state in which a laser spot is defocused on the photoelectric transducers 10a and 10b, i.e., the photosensitive drum 6. A decrease in sum of outputs from the photoelectric transducers 10a and 10b is smaller than that of the laser spot located between the photoelectric transducers 10a and 10b. When the laser spot is further defocused on the photoelectric transducers 10a and 10b, as indicated by FIG. 8(A)-(3), a decrease in output sum is further reduced. When the decrease in output sum obtained when the laser spot is located between the photoelectric transducers 10a and 10b is measured, whether an in-focus state is obtained can be measured.

Figure 9:
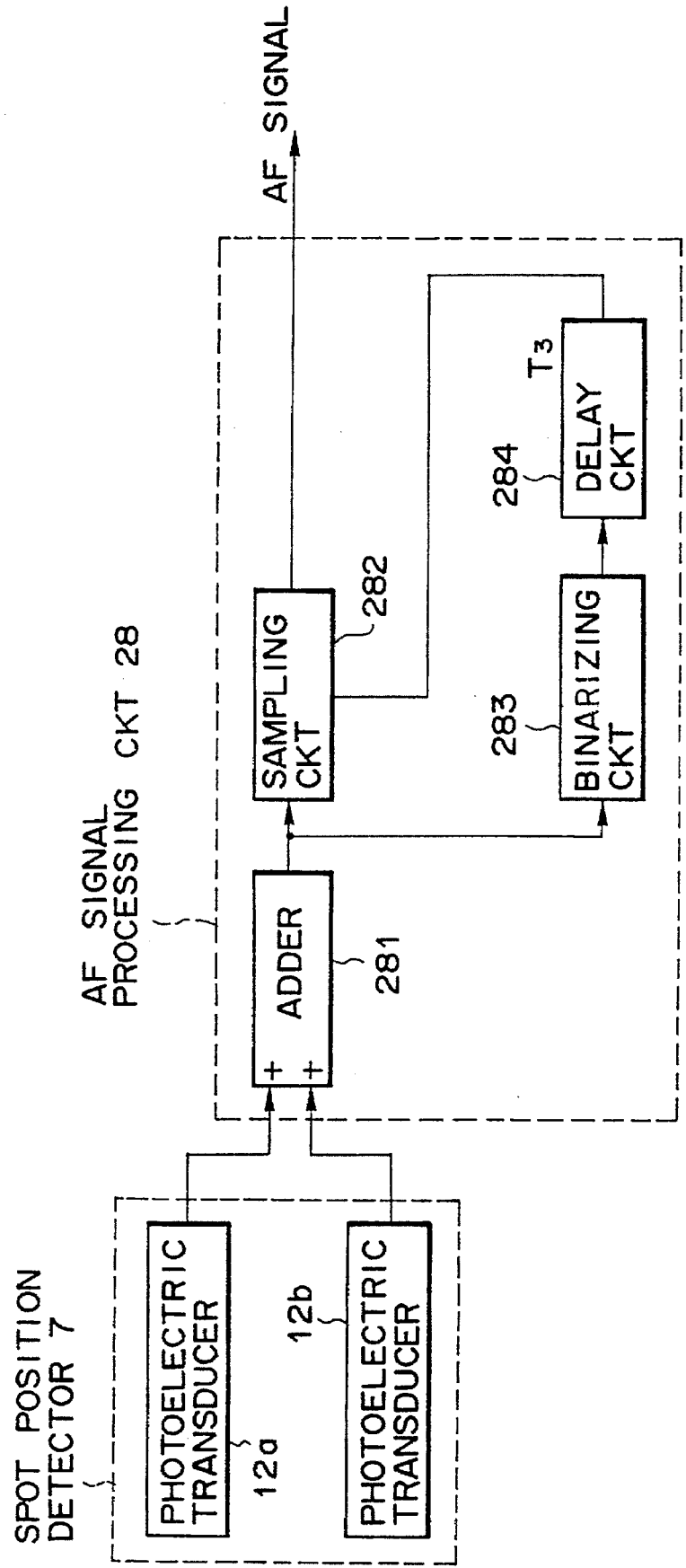
FIG. 9 is a schematic block diagram of an AF signal detector.

A circuit for detecting an in-focus state measurement signal, i.e., an AF signal will be described with reference to FIG. 9.

Outputs from the photoelectric transducers 10a and 10b of the spot position detector 7 of the first embodiment shown in FIG. 1 are connected to an AF signal processing circuit 28. An adder 281 adds the outputs from the photoelectric transducers 10a and 10b. An output from the adder 281 is connected to a sampling circuit 282 and a binarizing circuit 283. An output from the adder 281 is binarized by the binarizing circuit 283 in accordance with an appropriately selected threshold level. An output from the binarizing circuit 283 is set at high level from the measurement start time t1 to the measurement end time t3, as indicated in FIG. 6(e). A delay circuit 284 is triggered by a leading edge of an output from the binarizing circuit 283. A delay time interval T3 of the delay circuit 284 is set to be T3=t2−t1.

The output from the delay circuit 283 serves as a sampling pulse for the sampling circuit 282.

The sampling circuit 282 samples and holds an output from the adder 281. Referring to FIG. 8(B), the output from the sampling circuit 282 represents a decrease in output sum at the intermediate position and represents an AF signal.

The AF signal takes a minimum value at an in-focus position. One of the light source unit 1, the scanning lens system 5, and the photosensitive drum 6 is moved in the optical axis direction to move the focusing position in the optical axis direction, thereby finding an in-focus position.

When the photosensitive drum 6 is to be moved, it is moved together with the spot position detector 7. However, the spot position control system 2 may have a function of correcting inclination of the laser spot with respect to the recording scanning direction and an adjusting function in the optical axis direction, thereby detecting an in-focus state.

After the above positional errors are adjusted, a laser beam modulated in accordance with image information is output from the laser light source unit 1 and scans the photosensitive drum 6 along the scanning direction. At the same time, the photosensitive drum 6 is rotated in the sub scanning direction, thereby forming image information on the photosensitive drum 6.

Figure 10:
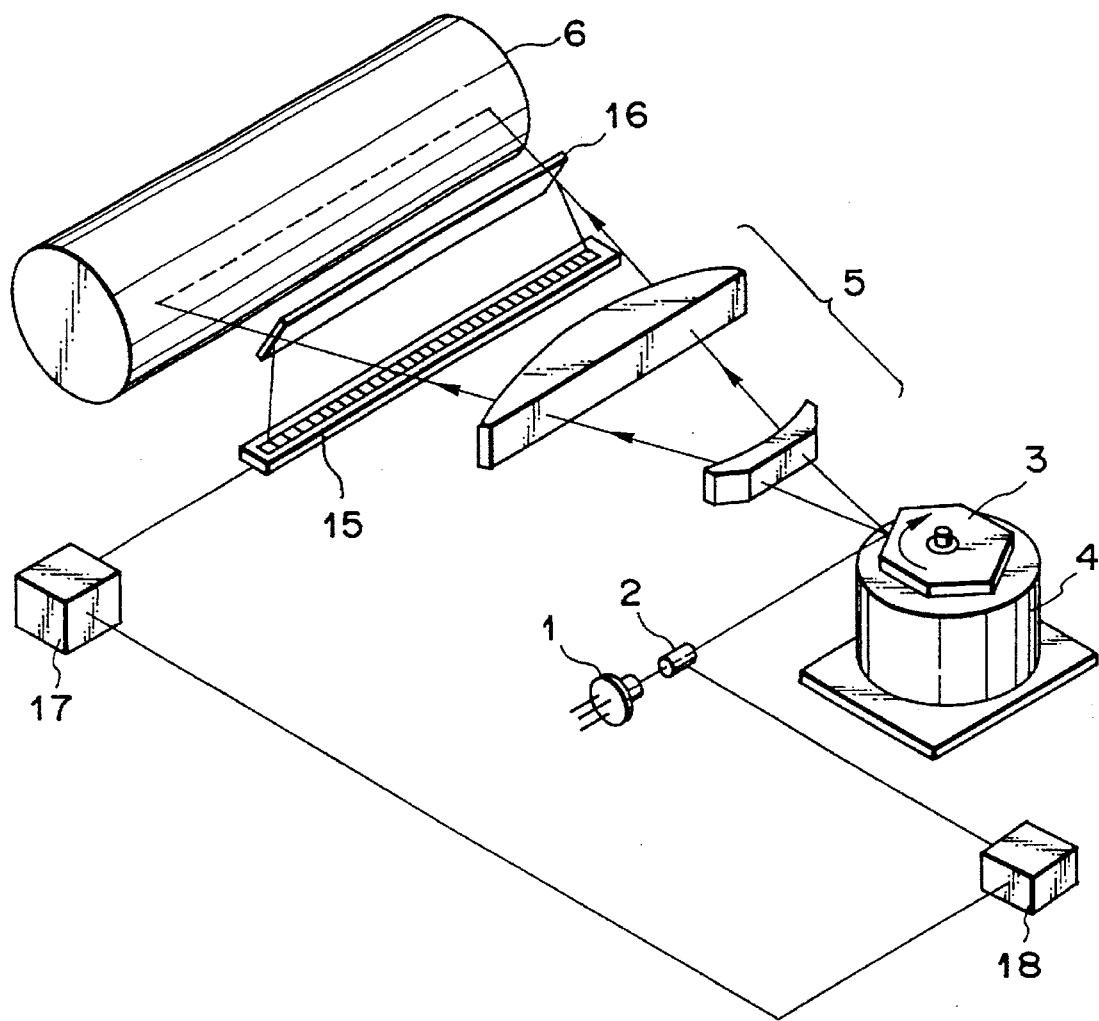
FIG. 10 is a perspective view showing a scanning optical apparatus according to the second embodiment of the present invention.

FIG. 10 shows a scanning optical apparatus according to the second embodiment of the present invention. A scanning laser beam is partially split by a beam splitter 16, and the split beam is guided to a spot position detector 15 located at a position optically equivalent to that of a photosensitive drum 6. In this embodiment, the spot position detector 15 has an arrangement in which its elements are arranged on a plane optically equivalent to the scanning surface in the scanning direction, as shown in FIG. 2 or 5, or an arrangement in which a photoelectric traducer element of the structure in FIG. 2 or 5 extends by a length corresponding to an effective scanning length in the scanning direction. With this structure, scanning positional errors can be controlled and corrected along the entire scanning lines.

In the second embodiment, a spot position control system 2 is controlled through a signal detection processing circuit 17 and a control circuit 18 in accordance with a signal from the detector 15, thereby correcting a positional error of the beam spot.

In the second embodiment, since errors of the spot positions can be directly observed on almost the entire surface of the photosensitive drum 6, more accurate control for positional errors can be performed. In particular, the second embodiment is effective in a system for performing focusing control. That is, in order to perform focal position control, a certain optical element must be moved, and a movement error tends to occur in a direction perpendicular to the laser scanning surface upon movement of this optical element. This error can be adjusted during signal recording according to the second embodiment.

Figure 11:
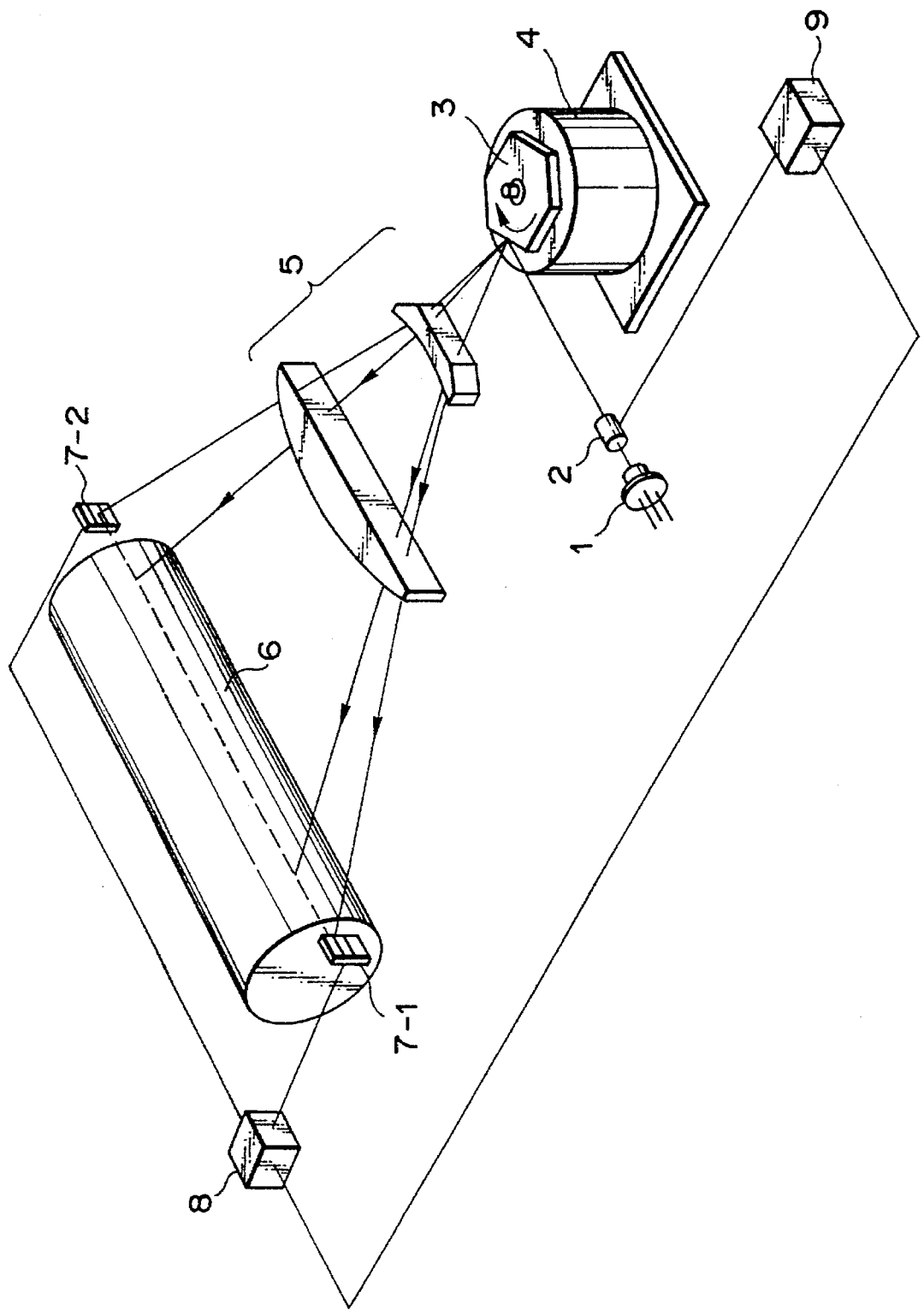
FIG. 11 is a perspective view showing a scanning optical apparatus according to the third embodiment of the present invention.

FIG. 11 shows a scanning optical apparatus according to the third embodiment of the present invention. In this embodiment, spot position detectors 7-1 and 7-2 are arranged at both sides of a photosensitive drum 6. With this layout, a small inclination of the scanning laser spot with respect to the scanning direction can also be detected, although this detection is difficult in the layout of the first embodiment.

Figure 12:
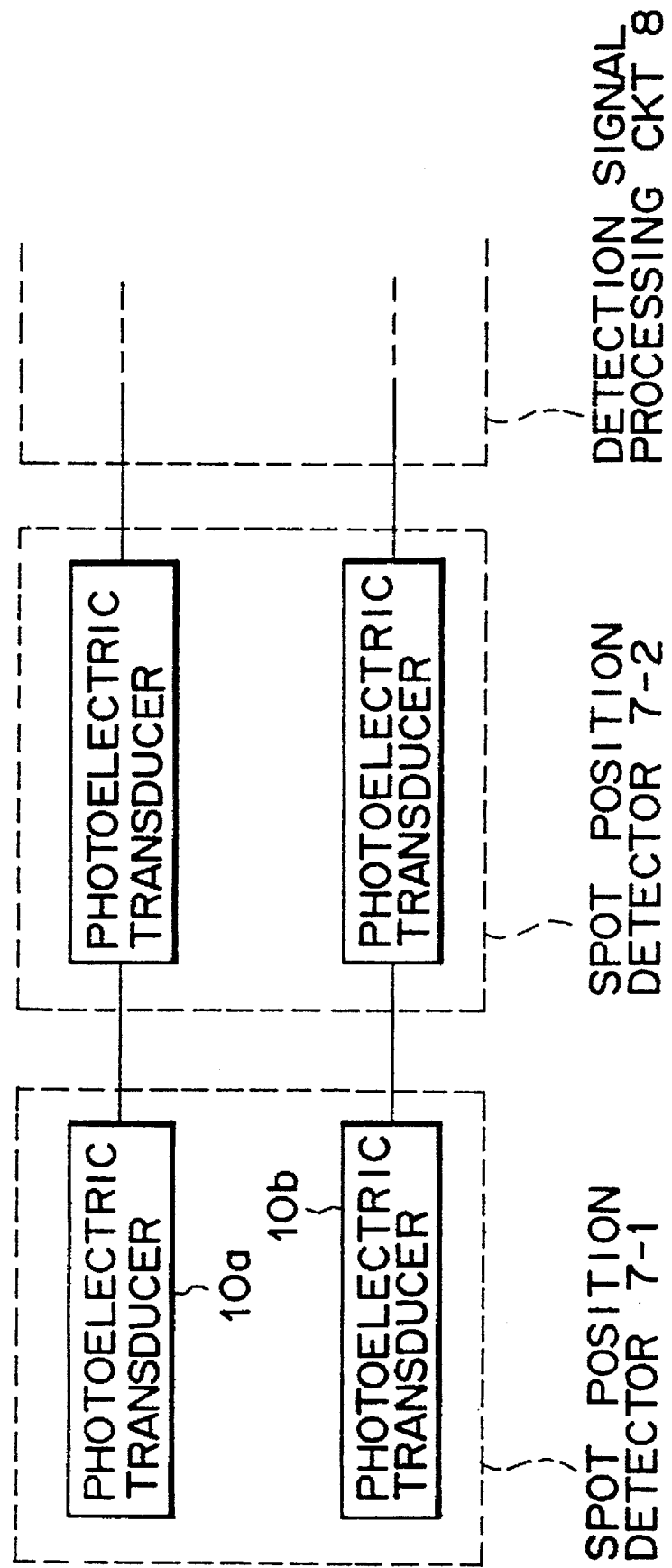
FIG. 12 is a block diagram showing a signal processing apparatus according to the third embodiment of the present invention.

The spot position detectors 7-1 and 7-2 are connected in parallel with each other, as shown in FIG. 12. A signal processing circuit 8 can be the circuit shown in FIG. 8.

According to the present invention as described above, a scanning optical apparatus comprises a means for detecting, in a direction perpendicular to a scanning surface of a beam, a scanning positional error of a beam spot on a scanning surface such as a photosensitive body or an original recorded with character image information, and a means for controlling movement of the beam spot in the direction perpendicular to the scanning surface, wherein the control means controls movement of a position of the beam spot so as to always scan the beam spot in a predetermined mode in accordance with the magnitude and a change as a function of time of a signal from the detecting means.

The means for detecting the scanning position of the beam spot on the scanning surface further has a function of detecting a focal point or focusing position of a beam within the scanning surface of the beam. In this case, a positional error of the beam spot in the direction perpendicular to the scanning surface and a positional error of a beam waist in a direction perpendicular to the direction of beam scanning within the scanning surface can be independently corrected.

Spot position control can be performed prior to recording/reading or during recording/reading.

In the former case, the spot position detecting means is located on a line extending from the scanning surface such as that of the photosensitive body. An optical position of the beam spot is detected prior to scanning of the scanning surface, and the control means is operated to scan this position.

In the latter case, a beam for scanning the scanning surface is split before the beam reaches the scanning surface. A plurality of spot position detecting means are arranged at a position optically equivalent to the scanning surface in the scanning direction. During scanning such as recording or reading, the beam spot position is detected by these detecting means, and at the same time, the control means is operated to scan the predetermined position with the beam spot.

The scanning surface according to the present invention is defined as a beam surface formed by a beam deflected by a deflecting reflecting surface of a deflector when the beam is measured as a function of time.

A scanning optical apparatus for scanning a beam from a light source on a scanning target through a deflector according to the present invention comprises a spot position detecting means for detecting a positional error of a beam in a direction perpendicular to a scanning direction, and a spot position control means for controlling a beam spot in a direction perpendicular to the beam scanning surface in accordance with the magnitude and a change as a function of time of a signal from the detecting means.

In addition, the spot position detecting means may be arranged to detect a focal point error of the beam within the scanning surface of the beam and independently control a position error in the direction perpendicular to the scanning surface and the focal point error of the beam within the scanning surface in accordance with the signal from the detecting means.

A scanning optical apparatus according to the present invention comprises a light source unit, a scanning means for deflecting a beam from the light source unit to scan a scanning surface with the beam, a detecting means for detecting the beam scanned on the scanning surface, and control means for controlling the beam scanned on the scanning surface in a direction perpendicular to the scanning surface on the basis of the magnitude and a change as a function of time of a signal output from the detecting means.

A scanning optical apparatus according to the present invention comprises a light source unit, a scanning means for deflecting a beam from the light source unit and scanning a scanning surface with the beam, a detecting means for detecting the beam scanned on the scanning surface, and a control means for controlling the beam scanned on the scanning surface in a direction perpendicular to the scanning surface on the basis of a change as a function of time of a signal output from the detecting means.

A scanning optical apparatus according to the present invention comprises a light source unit, a scanning means for deflecting a beam from the light source and scanning a scanning surface with the beam, a plurality of detecting means arranged in a scanning direction of the beam to detect the beam scanned on the scanning surface, and a control means for controlling the beam scanned on the scanning surface in a direction perpendicular to the scanning surface.

A scanning optical apparatus according to the present invention comprises a light source unit, a scanning means for deflecting a beam from the light source unit and scanning a scanning surface with the beam, a first detecting means for detecting a focal position of the beam scanned on the scanning surface, a control means for controlling the focal position of the beam scanned on the scanning surface in an optical axis direction of the scanning means on the basis of the signal output from the first detecting means, a second detecting means for detecting the scanning position of the beam scanned on the scanning surface, and a control means for controlling the beam scanned on the scanning surface in a direction perpendicular to the scanning surface on the basis of the signal output from the second detecting means.

In the scanning optical apparatuses having the above arrangements, when the beam from the light source is scanned on the scanning target through the deflector, a positional error of the scanning beam spot can be accurately detected, and appropriate adjustment can be performed on the basis of the appropriate detection of the positional error of the beam spot.

In the scanning optical apparatus for scanning and exposing a recording body surface with a light beam, in order to obtain a high-quality image, both scanning line feed pitch errors and positional errors of the image forming and focusing points must be corrected.

In order to perform both correction operations, when an optical correcting system used to correct a surface inclination of a polygonal mirror is employed, an image forming optical system inevitably becomes asymmetrical about the center of rotation. In this image forming optical system, in order to correct the positional error of the image forming point, when the image forming system is partially moved, aberration caused by correction of the positional error is generally different in quantities, qualities, and ratios between a sagittal plane (i.e., a plane perpendicular to the scanning surface formed when the scanning beam is scanned) and a meridional plane (scanning surface). It is difficult to cause the aberration to fall within an allowable range in both the sagittal and meridional planes.

A scanning optical system according to the present invention (to be described below) can correct both the scanning line feed pitch errors and the positional errors of the image forming position of the light beam without using an image forming optical system asymmetrical about its center of rotation in consideration of the object of the present invention.

In a scanning optical apparatus which can achieve the object of the present invention and in which a beam from a light source is scanned by a scanning means such as a polygonal mirror, and a scanned beam is focused on a scanning body through an image forming means, comprises a first detecting means for detecting an image forming position of the beam, a first control means for controlling the image forming position of the beam in an optical axis direction of the image forming means on the basis of information from the first detecting means, a second detecting means for detecting an optical scanning position on the scanning body, and a second control means for controlling the optical scanning means in a direction perpendicular to the scanning surface on the basis of information from the second detecting means, wherein the image forming means is symmetrical about its center of rotation.

More specifically, the first control means drives at least one of the light source, the scanning means, and the image forming means to control the image forming position of the light beam, and the second control means drives at least one of the light source, the scanning means, the image forming means, and the scanning body. Alternatively, the second control means is a change drive means for changing an optical scanning position in an optical path between the light source and the scanning body in a direction perpendicular to the scanning surface.

In the scanning optical apparatus having the above arrangement, the means for controlling and correcting the optical scanning position of the light beam is arranged together with the means for controlling and correcting the image forming position of the light beam, and at the same time, the image forming means comprises an optical system of rotational symmetry. Even if only a part, e.g., the image forming means, is driven and controlled to perform the above correction operation, aberration does not occur in the sagittal and meridional planes in a complicated mode. The image forming point of the light beam can be kept at an optimal position by a simple control correction system or means.

Figure 13:
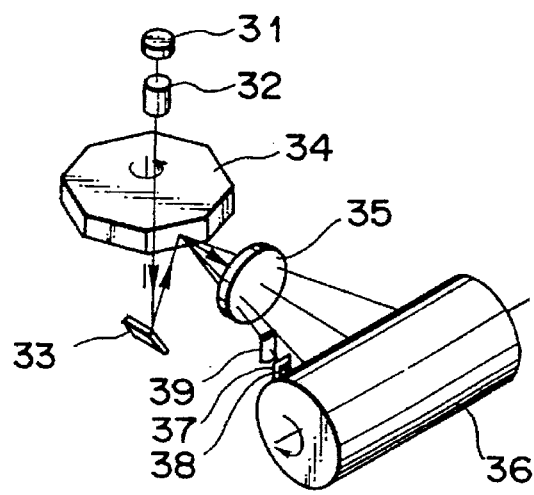
FIG. 13 is a perspective view of a scanning optical apparatus according to the fourth embodiment of the present invention.

FIG. 13 shows a scanning optical apparatus according to the fourth embodiment of the present invention. Referring to FIG. 13, a light beam emitted from a semiconductor laser source 31 is collimated by a collimator lens 32 and is guided to a polygonal mirror 34 through a reflecting mirror 33. A light beam deflected and scanned by the polygonal mirror 34 is focused on a recording medium wound around a drum 36 by an image forming f·θ lens 35 symmetrical about its center of rotation. The recording medium is then scanned with the laser beam.

In each scanning cycle, a knife edge 37 and a photodetector 38 detect the laser beam through a cylindrical lens 39, and the resultant horizontal sync signal is used to optically modulate the laser source 31 in accordance with image information every scanning cycle.

Figure 14A:
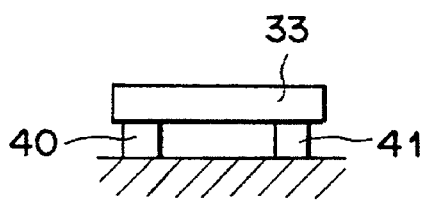
FIG. 14A is a side view of a reflection mirror.
Figure 14B:
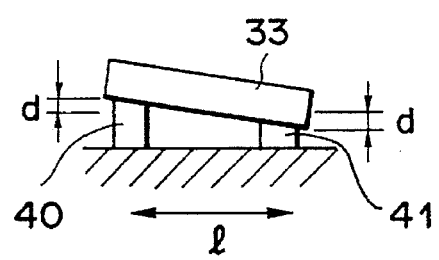
FIG. 14B is a view for explaining an operation wherein the reflection mirror is inclined.

In the scanning optical apparatus having the above arrangement, the reflecting mirror 33 is supported on supports 40 and 41 such as a PLZT or piezoelectric element made of a piezoelectric material, as shown in FIGS. 14A and 14B. As shown in FIG. 14B, when electric field components having opposite polarities are applied to the supports 40 and 41, the reflecting surface of the reflecting mirror 33 can be controlled to be inclined.

A distance between the supports 40 and 41 is defined as l, a voltage applied to each support 40 or 41 is defined as V, and a displacement of the supports 40 and 41 is defined as d. Under these conditions, when electric field components having opposite polarities are applied to the supports 40 and 41, respectively, an inclination angle θ of the reflecting mirror is given as θ=2d/l. For example, if l=5 mm and d=1 μm., then θ=1.38". When the reflecting mirror 33 is driven and controlled in the same manner as in surface inclination correction of the polygonal mirror 34, the scanning line feed pitch errors on the recording body, caused by surface inclination, can be eliminated. It is, therefore, possible to use a scanning optical system as an optical system symmetrical about its center of rotation.

Figure 15A:
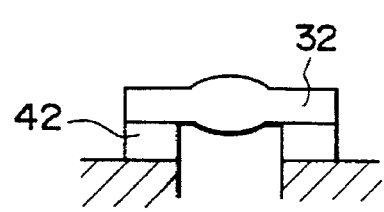
FIG. 15A is a sectional view of a collimator lens.
Figure 15B:
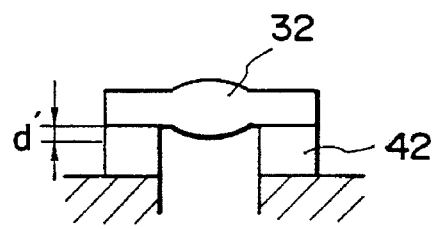
FIG. 15B is a view for explaining an operation wherein the collimator lens is driven.

As shown in FIGS. 15A and 15B, the collimator lens 32 is fixed on a support 42 of a PLZT or piezoelectric element made of a piezoelectric material. As shown in FIG. 15B, upon application of an electric field to the support 42, the collimator lens 32 is driven in the optical axis direction. When the collimator lens 32 is moved from a reference position in the optical axis direction, a light beam which passes through the collimator lens 32 is changed from the collimated beam to a divergent or convergent beam, depending on its moving direction and amount. The beam is then deflected and scanned by the polygonal mirror 34 and is then focused by the f·θ lens 35 at a position different from a predetermined position.

By driving and controlling the collimator lens 32, the image forming position of the light beam on the recording body on the drum 36 can be changed in the optical axis direction. Even if a change in spot image forming position occurs due to aberration of the image forming optical system or thermal expansion, the light beam can always be focused on the recording body at the predetermined position upon exposure and scanning of the recording body with the light beam. At this time, when a rotationally symmetrical image forming optical system is used as the scanning optical system, aberration occurring at the time of a change in position of an element constituting the optical system is generally different in quantities, qualities, and ratios between the sagittal and meridional planes. It is difficult to set the changes in image forming position of the light beam within the predetermined allowable range according to the conventional method described above. In order to set the changes within the allowable range, the image forming optical system becomes complicated and complicated driving control must be performed according to the conventional method.

In the above embodiment, however, the above problem is not posed since the rotationally symmetrical image forming optical system is used. In the above embodiment, although the reflecting mirror is arranged in the image forming system as a means for changing the optical scanning position of the beam spot, another means such as a prism may be arranged in place of the reflecting mirror. In general, since a method or means for inclining an optical axis can be employed, a means for driving an image forming means may also be used. As a means for changing the image forming position of the light beam, a means for driving the collimator lens 32 is employed. However, another member (e.g., the f·θ lens 35) may be driven. Any general method or means for changing a focal length of an image forming system can be employed.

A means for detecting an optical scanning position of a light beam and a means for detecting an image forming state or position of the light beam, which are used to control the reflecting mirror 33 and the collimator lens 32, will be described below.

In order to detect an offset of the light beam from a predetermined scanning line on the recording body on the drum 36 or inclination of the scanning direction of the light beam with respect to the reading scanning direction, a pair of photoelectric transducer elements extending along the scanning line are arranged at a position optically equivalent to that of the recording body, as described with reference to the previous embodiment. When a light beam is scanned along a predetermined scanning line, the amounts of light detected by the pair of photoelectric transducer elements are equal to each other. The incident light amount is appropriately processed to detect that the optical scanning position is an optimal position. However, when the light beam is offset from the scanning line, an amount of light received by one photoelectric transducer element is larger than that by the other photoelectric transducer element. This unbalance is appropriately processed to detect an offset amount. The inclination of the light beam with respect to the scanning line is detected as follows. An amount of light detected is changed from one photoelectric transducer element to the other photoelectric transducer element, and a change amount is measured by an appropriate processing circuit to detect a degree of inclination.

As described above, since the reflecting mirror 33 or the like is controlled on the basis of the detection information of the scanning optical apparatus, the optical scanning position can be optimally controlled.

This control can be performed by fixing the reflecting mirror 33 of the like upon performing laser scanning a plurality of times prior to recording or without fixing the reflecting mirror 33 or the like. When the reflecting mirror 33 or the like is not fixed, a laser is oscillated near a spot detector during a blanking period of signal recording scanning, and the control operation is performed as described above, thereby fixing the reflecting mirror 33 or the like at the optimal position. Alternatively, when a predetermined environmental fluctuation is present, intermittent control may be performed, or a control value may be detected in units of scanning positions and stored in a memory, thereby performing real-time control during light beam scanning.

A spot detector for detecting an optical scanning position may be arranged outside the effective scanning area (i.e., one spot detector is arranged on one side, or two spot detectors are respectively arranged on both sides). The beam focused within the effective scanning area is split before it reaches the effective scanning area, and the detector may be arranged at an incident position of the split beam.

In any case, the means for detecting the optical scanning position is not limited to any specific means, and an appropriate means may be used in accordance with design specifications.

As a means for detecting an image forming state of the light beam, a slit-like photoelectric transducer element extending in a direction perpendicular to the scanning line is arranged at a position optically equivalent to that of the recording body.

When the image forming position of the light beam has a predetermined relationship with the recording body serving as the scanning surface, for example, a slit-like photoelectric transducer element detects a maximum peak value, a spot having a minimum divergent light amount distribution, or a spot having a maximum sharpness, thereby detecting that the image forming position of the light beam is optimal.

The collimator lens 32 or the like is fixed at a position corresponding to the optimal image forming position of the light beam, and signal recording scanning is performed. The image forming position can also be controlled intermittently, in real time, or any other mode as in control of the optical scanning position. In this manner, no limitation is imposed on the means for detecting the image forming position, and an appropriate means may be used in accordance with design specifications.

According to the present invention, the scanning optical apparatus for focusing and scanning a beam from a light source on a scanning body through a scanning means and an image forming means, comprises a first detecting means for detecting an image forming position of the beam, a first control means for controlling the image forming position of the beam in an optical axis direction of the image forming means on the basis of information from the first detecting means, a second detecting means for detecting an optical scanning position on the scanning body, and a second control means for controlling the optical scanning position in a direction perpendicular to the scanning direction on the basis of information from the second detecting means, wherein the image forming means is symmetrical about its center of rotation.

The first control means drives at least one of the light source, the scanning means, and the image forming means to control the image forming position of the beam.

The second control means drives at least one of the light source, the scanning means, the image forming means, and the scanning body to control the optical scanning position.

The second control means is arranged in an optical path between the light source and the scanning body.

The second control means comprises a reflecting mirror which can be inclined.

In the scanning optical apparatus according to the above embodiment of the present invention, there are provided the means for controlling and correcting the optical scanning position of the light beam and the means for controlling and correcting the image forming position of the light beam. A rotationally symmetrical optical system can be used as the image forming means while scanning line feed pitch errors can be minimized. The position of the image forming point of the light beam can have a predetermined positional relationship with the position of the scanning surface such as the recording body by the simple correction control system or means. Therefore, high-quality image recording or the like can be easily performed.

A scanning optical apparatus to be described below can more effectively correct and control at least one of an image forming position error or an optical scanning position error generated during scanning.

In order to achieve this object, there is provided a scanning optical apparatus for focusing and scanning a beam from a light source on a scanning body through a scanning means for one-dimensionally scanning the light beam and an image forming means for focusing the light beam from the light source on the scanning body, comprising at least one of a first detecting means for detecting an optical scanning position on the canning body and a second detecting means for detecting an image forming position of the beam, and at least one of a first control means for controlling the optical scanning position in a direction perpendicular to a scanning surface (a surface formed when the scanning beam is scanned as a function of time) on the basis of information from the first detecting means and a second control means for controlling the image forming position of the beam in an optical axis direction of the image forming means on the basis of information from the second detecting means, wherein a predetermined scanning operation such as recording or reading is started after it is determined that at least one of the optical scanning position and the image forming position of the beam is stabilized within a predetermined change range.

In the scanning optical apparatus having the above arrangement according to the present invention, after at least one of the image forming position and the optical scanning position is stabilized within the predetermined change range in the entire effective scanning area, recording or the like is started. The apparatus arrangement is not overloaded, and the predetermined operation can be performed while the light beam is maintained in a predetermined state along the entire scanning lines.

FIG. 16 shows a scanning optical apparatus according to the fifth embodiment of the present invention. The scanning optical apparatus shown in FIG. 16 includes a light source unit 51 including a semiconductor laser and a collimator lens, a control system 52 for controlling at least one of the image forming position and the optical scanning position of the light beam, a rotary polygonal mirror 53 for deflecting and scanning a beam from the light source unit 51, a motor 54 for driving the rotary polygonal mirror 53, a scanning lens system 55, a photosensitive drum 56, a light beam detector 65 of a two-dimensional image pickup element such as a CCD or MOS, a beam splitter 66 for partially splitting the scanning beam and guiding the split beam to the light beam detector 65, a signal processing circuit 67 for processing a signal obtained by the beam detector 65, a control circuit 68 for supplying a control signal to the control system 52 on the basis of an output signal from the signal processing circuit 67, and a light source drive control circuit 69 for driving the light source unit 51 on the basis of image data and an output signal from the signal processing circuit 67.

In the fifth embodiment having the above arrangement, in order to stabilize at least one of the image forming position and the scanning position of the light beam within a predetermined range, a weak beam which is not susceptible to sensitization on the recording body 56 is generated. This light beam is scanned by the rotary polygonal mirror 53 and is guided to the light beam detector 65 through the scanning lens system 55 and the beam splitter 66. At this time, when errors of the image forming position and the scanning position are detected by the light beam detector 65 for detecting spot diameter and scanning position of the light beam and the signal processing circuit 67, the image forming position and/or scanning position control system 68 is driven by the control circuit 68 on the basis of this detection information, thereby correcting the errors of the image forming position and the optical scanning position. After these operations are completed, when the signal processing circuit 67 determines that the spot diameter and scanning position of the light beam are stabilized within the predetermined range on the whole effective scanning area on the light beam detector 65, the processing circuit 67 supplies a signal to the light source drive control circuit 69, and the light source drive control circuit 69 starts driving the light source unit 51 on the basis of the image data.

FIG. 17 shows a scanning optical apparatus according to the sixth embodiment of the present invention. Referring to FIG. 17, this scanning optical apparatus includes a reflecting mirror 66' for totally reflecting the beam and guiding the beam to a light beam detector in place of the beam splitter for partially splitting the scanning beam, and a control system for driving the reflecting mirror 66' on the basis of an output signal from a signal processing circuit 67. As for other parts, the reference numerals as in FIG. 16 denote the same parts in FIG. 17.

In the sixth embodiment, after correction control is completed, it is determined that the image forming position and the optical scanning position of the light beam fall within the predetermined change range. Immediately before the light beam including the image information is about to be sent from the light source unit 51, the reflecting mirror 66' is moved upward in accordance with a signal from the signal processing circuit 67, thereby exposing the recording body 56 with the light beam.

Figure 18:
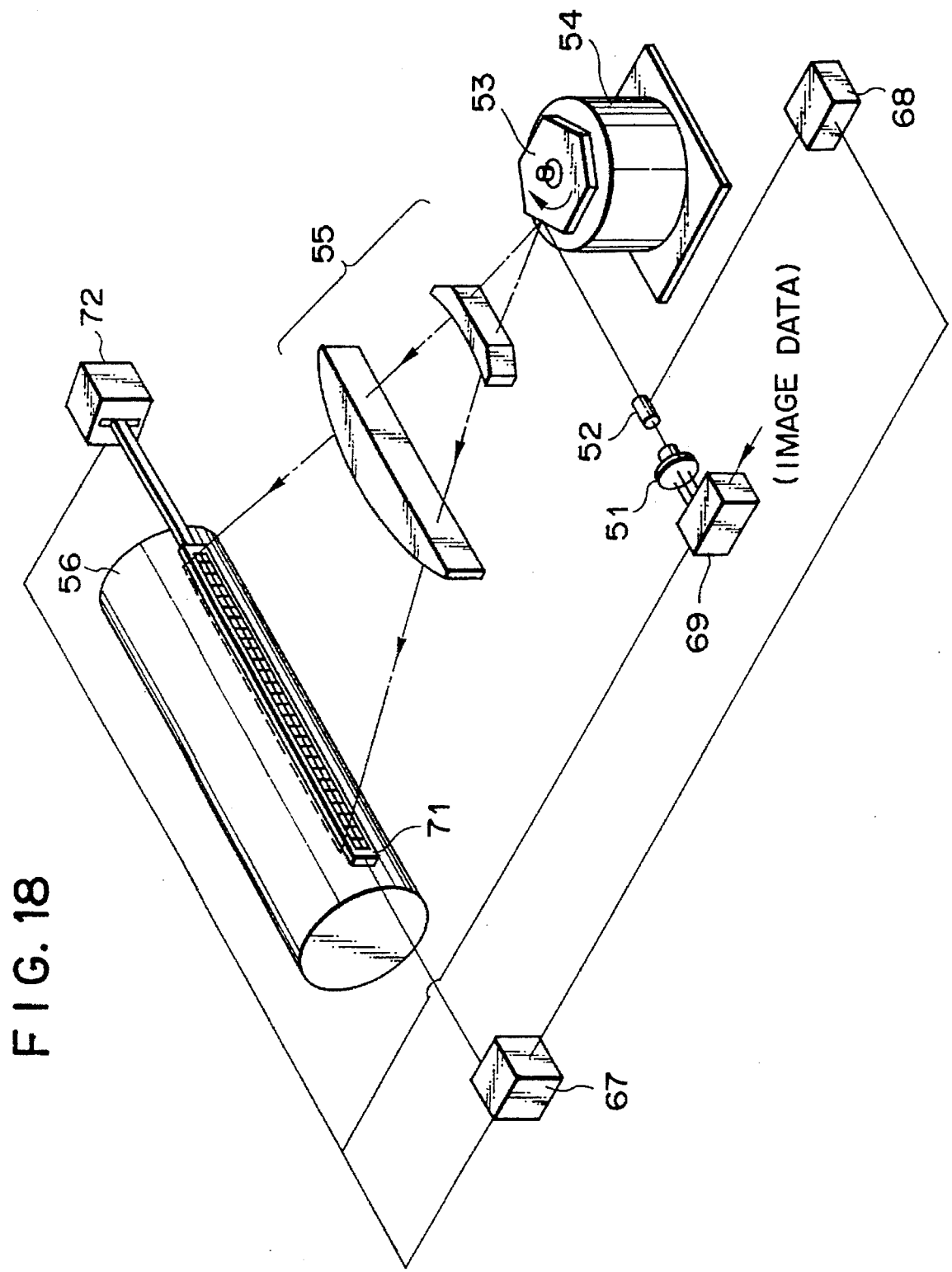
FIG. 18 is a perspective view of a scanning optical apparatus according to the seventh embodiment of the present invention.

FIG. 18 shows a scanning optical apparatus according to the seventh embodiment of the present invention. A light beam detector 71 is arranged in front of a recording body 56, and the beam splitter 66 is omitted in the arrangement of the seventh embodiment. A control system 72 is arranged to drive the light beam detector 71 on the basis of an output signal from a signal processing circuit 67.

In the seventh embodiment, after the correction operations are completed, when it is determined that the image forming position and the scanning position of the light beam are stabilized within the predetermined range and a light beam including image data is about to be output from a light source unit 51, the light beam detector 71 is moved upward or downward from the position shown in FIG. 18 in response to the signal from a signal processing circuit 67, thereby exposing the recording body 56 with the light beam.

Any arrangement can be used as the light beam detector 65 or 71 if this arrangement can detect the optical scanning position and the image forming position.

In order to detect an offset of a light beam from a predetermined scanning line on the recording body 56 or inclination of the light beam scanning direction with respect to the scanning line, a pair of photoelectric transducer elements extending along the scanning line is arranged at a position optically equivalent to that of the recording body 56, as previously mentioned. When a light beam is scanned along a predetermined scanning line, the amounts of light detected by the pair of photoelectric transducer elements are equal to each other. The amount of light detected by each photoelectric transducer element is processed by the signal processing circuit 67, so that the optical scanning position is detected to be optimal. When the light beam, however, is offset from the predetermined scanning line, the amount of light received by one photoelectric transducer element is larger than that by the other photoelectric transducer element. This unbalance is processed by the processing circuit 67, and a difference between the amounts of light received by the pair of electrophotographic transducers is detected. When the scanning direction of the light beam is oblique with respect to the predetermined scanning line, an amount of light detected is changed from one photoelectric transducer element to the other photoelectric transducer element. This change amount is measured by the processing circuit 67 to detect a degree of inclination.

When a control system 52 is driven on the basis of the detection signal of this optical scanning position, the optical scanning position is optimally controlled. As a means for changing the optical scanning position, any system or means for inclining an optical axis may be employed such that at least one of the light source, the scanning means, the image forming means, and the scanning body is driven.

As a means for detecting an image forming state of the light beam, a slit-like photoelectric transducer element extending in a direction perpendicular to the scanning line is arranged at a position optically equivalent to that of the recording body 56.

When the image forming position of the light beam has a predetermined relationship with the recording body 56 serving as the scanning surface, the slit-like photoelectric transducer element detects a maximum peak value, a spot having a minimum divergent light amount distribution or a spot having a maximum sharpness. A detection output from the slit-like photoelectric transducer element is processed by the processing circuit 67 to detect that the image forming position of the light beam is optimal.

The control system 52 is driven on the basis of the detection information of the image forming position to optimally control the image forming position. Any method and means for changing a focal length of the image forming system wherein at least one of the light source, the scanning means, and the image forming means is driven may be employed as the image forming position changing means.

The above correction control can be achieved by performing laser scanning a plurality of times prior to recording and by fixing the control system 52 to the optimal position. However, when a predetermined environmental fluctuation is present, intermittent correction control may be performed.

Each of the light beam detectors 65 and 71 may have a function of detecting one of the image forming position and the optical scanning position, or a function of detecting both the image forming and optical scanning positions. In the latter case, it is possible to arrange elements such that elements which detect the image forming positions are alternately arranged with elements which detect the optical scanning positions. In this case, the operation for switching between the optical scanning position detecting elements and the image forming position detecting elements is performed upon each beam scanning cycle, and outputs from the optical scanning position detecting elements or the image forming position detecting elements are processed by the processing circuit 67, thereby performing correcting control. In this case, separate beam detectors having these functions may be arranged, and outputs from these detectors may be processed by the corresponding processing circuits, thereby simultaneously performing correcting operations for the optical scanning position and the image forming position.

A scanning optical apparatus according to the present invention comprises a light source unit, a scanning means for deflecting a beam from the light source unit and scanning a scanning surface with the light beam, a detecting means for detecting a scanning position of the light beam scanned on the scanning surface, a control means for controlling the light beam scanned on the scanning surface in a direction perpendicular to the scanning surface on the basis of a signal output from the detecting means, a means for determining whether the scanning position of the light beam scanned on the scanning surface is controlled by the control means to fall within a predetermined change range, and a means for driving the light source unit on the basis of the determining means.

According to the present invention, a scanning optical apparatus for focusing and scanning a light beam from a light source on a scanning body through a scanning means and an image forming means, comprises a first detecting means for detecting an optical scanning position on a scanning body, and a first control means for controlling the optical scanning position in a direction perpendicular to the scanning surface on the basis of information from the first detecting means, wherein a predetermined operation is started after it is determined that the optical scanning position is stabilized within a predetermined change range.

According to the present invention, a scanning optical apparatus for focusing and scanning a light beam from a light source on a scanning body through a scanning means and an image forming means, comprises a second detecting means for detecting an image forming position of the light beam, and a second control means for controlling the image forming position of the light beam in an optical axis direction of the image forming means on the basis of information from the second detecting means, wherein a predetermined scanning operation is started after it is determined that the image forming position of the light beam is stabilized within a predetermined change range.

According to the present invention, a scanning optical apparatus for focusing and scanning a light beam from a light source on a scanning body through a scanning means and an image forming means, comprises a first detecting means for detecting an image forming position of the light beam, a first control means for controlling the image forming position of the light beam in an optical axis direction of the image forming means on the basis of information from the first detecting means, a second detecting means for detecting an optical scanning position on the scanning body, and a second control means for controlling the optical scanning position in a direction perpendicular to the scanning surface on the basis of information from the second detecting means, wherein a predetermined scanning operation is started after it is determined that the optical scanning position and the image forming position of the light beam are stabilized within a predetermined change range.

As described above, in the scanning optical apparatus having the above arrangement, recording or the like is performed after the image forming position of the light beam and/or the scanning position are/is stabilized within the predetermined range. The processing circuit and the like are not overloaded. During image recording or the like, the position and the focusing state of the light beam can be optimally maintained on the scanning body throughout the entire effective scanning area.

The following scanning optical apparatus according to the present invention has a high correction response speed for a scanning positional error generated during scanning and can be low cost and perform a high-speed operation.

In this scanning optical apparatus for achieving the above object, a beam emitted from a light source array having light source elements such as a plurality of semiconductor laser elements having a sufficiently high response speed is deflected and scanned on a scanning medium by a deflector such as a rotary polygonal mirror. The light source elements of the light source array are selectively ON/OFF-controlled in accordance with a scanning positional error occurring during scanning. Therefore, scanning line pitch errors on the scanning medium in the sub scanning direction are corrected.

A light source element having a sufficiently high response speed can be exemplified by a semiconductor laser. In order to improve precision of pitch error correction, an array direction of the light source array may be inclined from the sub scanning direction.

With the above arrangement, an image formed on the scanning medium by the light source elements arranged at predetermined intervals in the sub scanning direction is formed at a position offset in the sub scanning direction. When the plurality of light source elements are selectively and properly turned on in accordance with scanning position errors occurring during scanning, the scanning line pitch errors caused by surface inclination of the rotary polygonal mirror and the like in the sub scanning direction can be corrected.

Figure 19:
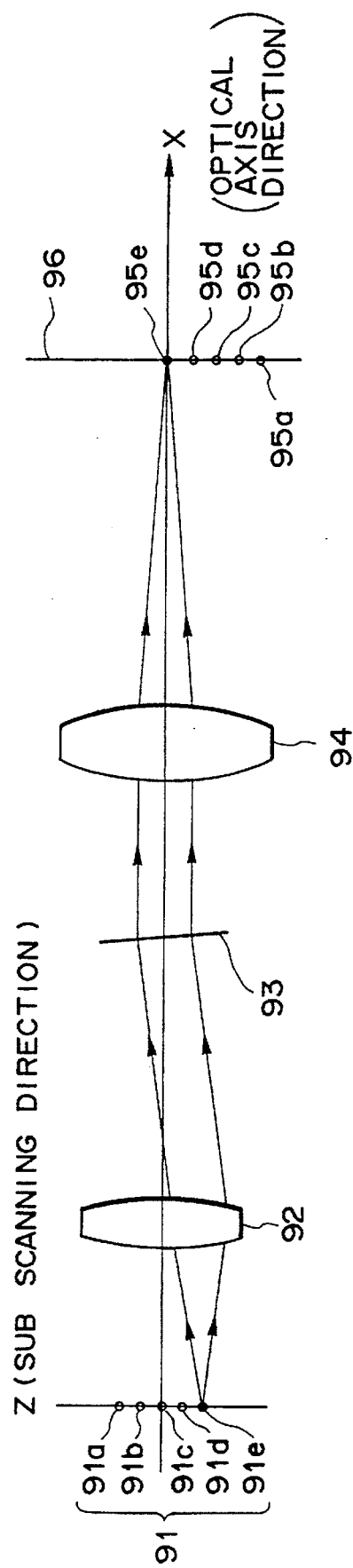
FIGS. 19 and 20 are views for explaining an arrangement of the scanning optical apparatus of the eighth embodiment in the sub scanning direction and its operation.
Figure 20:
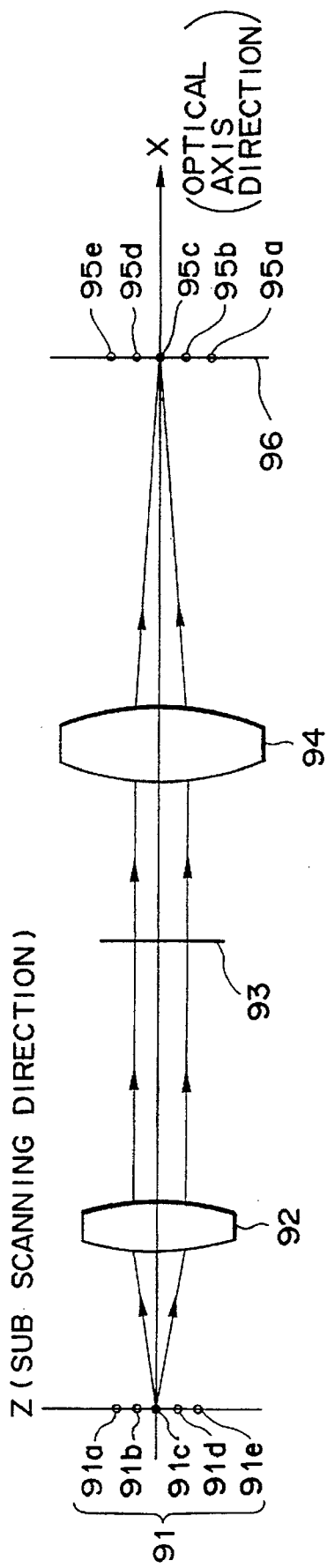

FIGS. 19 and 20 show a schematic arrangement of a scanning optical apparatus of the eighth embodiment in a sectional view taken along the sub scanning direction (i.e., of two directions perpendicular to the optical axis of the scanning/image forming optical system, a direction except for the light scanning direction).

The scanning optical apparatus includes a semiconductor laser array 91 consisting of laser elements 91a to 91e, a collimator lens 92, a deflecting reflecting surface 93 of a polygonal mirror, and a rotationally symmetrical f·θ lens 94. Images 95a to 95e are formed on a photosensitive body 96 in correspondence with light components emitted from the laser elements 91a to 91e. A direction x is an optical axis direction, and a direction z is a sub scanning direction. FIG. 19 shows a state wherein surface inclination of the polygonal mirror is present, and FIG. 20 shows a state wherein surface inclination of the polygonal mirror is not present.

Figure 21:
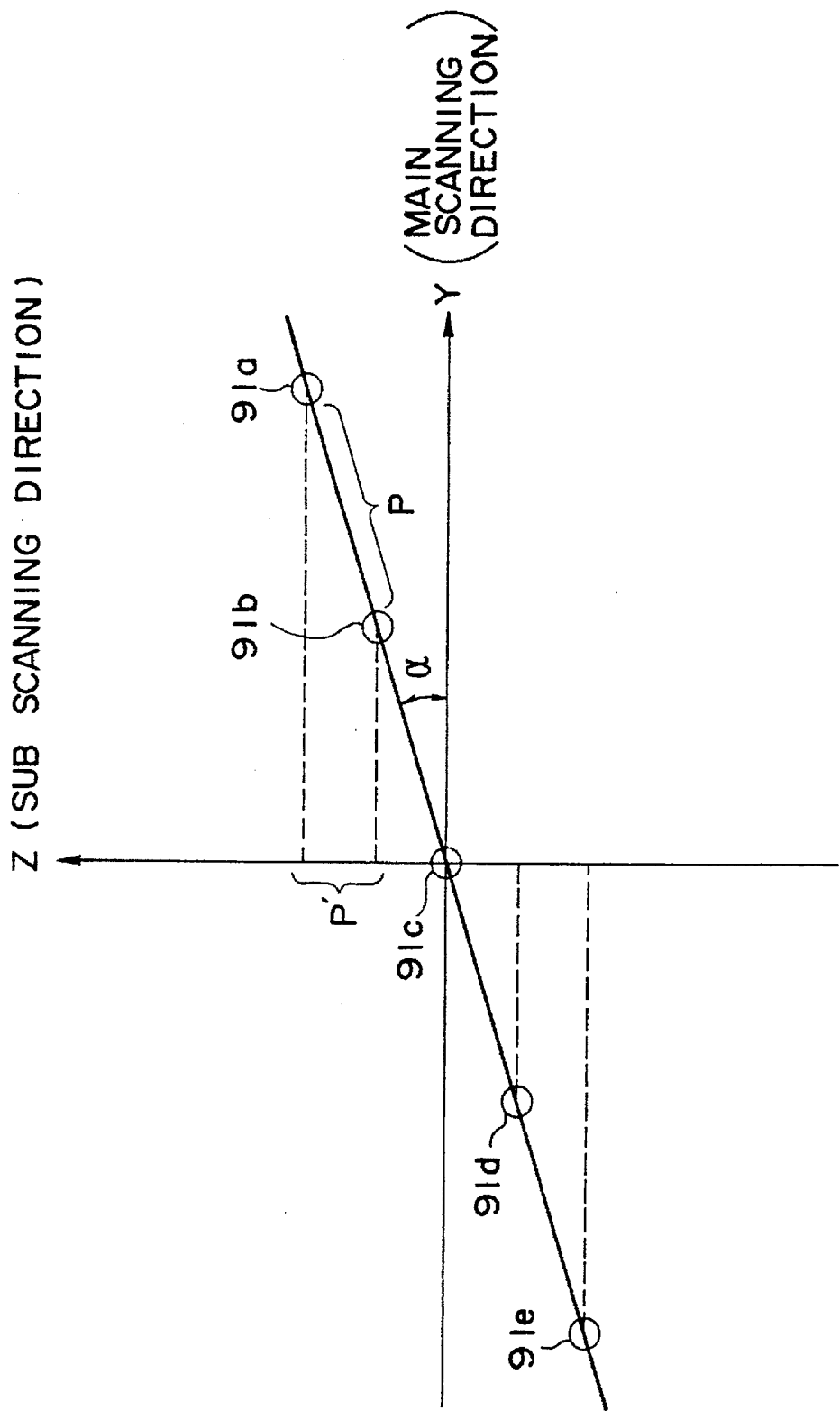
FIG. 21 is a view showing a state wherein a semiconductor array in the eighth embodiment is viewed from the front.

FIG. 21 shows a state obtained when the laser elements 91a to 91e of the semiconductor laser array 91 are viewed from the front (from the optical axis direction).

With the above arrangement, laser beams emitted from the laser elements 91a to 91e of the semiconductor laser array 91 are collimated by the collimator lens 92 and are reflected and deflected by the reflecting surface 93 of the polygonal mirror. The deflected beams are converged by the f·θ lens 94 to form the beam spots 95a to 95e on the photosensitive body 96. These beam spots are scanned in the main scanning direction (y direction) upon rotation of the polygonal mirror. At the same time, the photosensitive drum 96 is moved in the sub scanning direction, thereby forming a two-dimensional image on the photosensitive body 96.

As described above, FIG. 20 shows an operation performed when the reflecting surface 93 of the polygonal mirror is not inclined. In this case, only the element 91c of the laser elements 91a to 91e, which is located on the optical axis, is turned on, and the remaining elements, i.e., the elements 91a, 91b, 91d, and 91e are kept OFF. Only one beam spot 95c is formed on the photosensitive body 96 at a desired position in the sub scanning direction. This beam spot is scanned in the main scanning direction to draw a desired scanning line.

As shown in FIG. 19, when the reflecting surface 93 of the polygonal mirror is inclined, the images 95a to 95e of the laser elements 91a to 91e of the semiconductor laser array 91 are shifted in the sub scanning direction, as compared with the state in FIG. 20. In this case, when optical scanning is performed while the laser element 91c on the optical axis is kept ON, the image 95c is shifted from the desired scanning line position to cause a scanning line pitch error in the sub scanning direction.

In the state shown in FIG. 19, the laser element 91c on the optical axis is turned off, and the laser element 91e is turned on in place of the laser element 91c. The image 95e is then formed on the desired scanning line position, thereby correcting the scanning line pitch error.

When the ON laser element is changed in accordance with a surface inclination amount with respect to each reflecting surface of the polygonal mirror, the scanning line pitch errors can be corrected on the entire surface of the photosensitive body 96.

In the eighth embodiment described above, the surface inclination amounts of the respective reflecting surfaces of the polygonal mirror are measured in advance, and an ON element is selected from the laser elements 91a to 91e in correspondence with the surface inclination amounts during optical scanning, thereby controlling the apparatus.

FIG. 21 shows an arrangement of the semiconductor laser array 91. Reference symbol p denotes an interval between the adjacent laser elements; p', a sub scanning component of the element interval p; and α, an angle formed between the laser array 91 and a main scanning component y.

In general, a beam from the semiconductor laser array 91 is enlarged by an image forming/scanning optical system and is focused on the photosensitive body 96. An image forming magnification is defined as a ratio of the focal length of the f·θ lens 94 to that of the collimator lens 92 in this embodiment. If this magnification is assumed to be 10 times (e.g., the focal length of the f·θ lens 94 is 200 mm, and the focal length of the collimator lens 92 is 20 mm), an interval between the element images is 1 mm for a semiconductor laser array having an element interval p of 0.1 mm. When the array direction coincides with the sub scanning direction, the interval of the images in the sub scanning direction is as large as 1 mm and is inconvenient for pitch error correction.

In order to prevent this, as shown in FIG. 21, the sub scanning component p' of the element interval p which determines an image interval in the sub scanning direction is reduced by inclining the array direction from the main and sub scanning directions. As shown in FIG. 21, when the semiconductor laser array 91 is arranged to form an angle α between the main scanning direction and the array direction, the sub scanning component p' of the element interval p is given as $p' = p \sin \alpha$. The sub scanning component of the element image interval can be reduced.

If $\theta = 1°$ and the assumption concerning the magnification is utilized, the sub scanning component of the element image interval can be set to be 17 μm. This value is small enough to correct the scanning line pitch error.

In the above embodiment, the semiconductor laser array 91 comprises five laser elements. The arrangement of the semiconductor laser array is not limited to this arrangement. The number of laser elements is not limited to any specific number if it is two or more.

In the above embodiment, the surface inclination amounts of the respective reflecting surfaces of the polygonal mirror are measured in advance in correspondence with the positional errors occurring during scanning, and an ON laser element corresponding to each reflecting surface is determined. The apparatus is controlled based on the above correspondence. However, a spot position detector may be arranged at a position optically equivalent to that of the photosensitive drum, and a scanning positional error caused by inclination of each reflecting surface of the polygonal mirror may be detected by the detector. In this case, an ON laser element is controlled on the basis of the detection signal from the detector.

Figure 22:
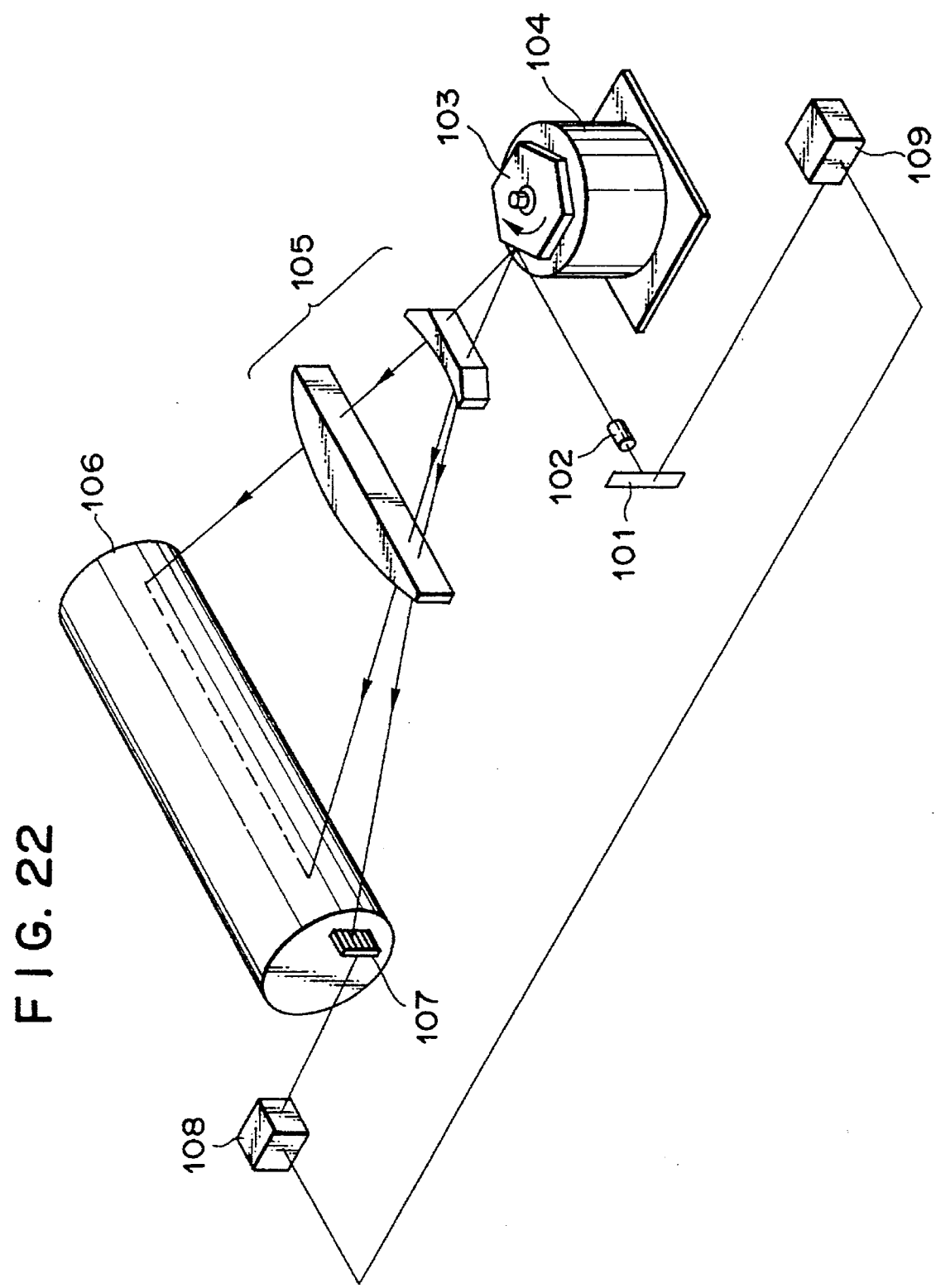
FIG. 22 is a perspective view of a scanning optical apparatus according to the ninth embodiment of the present invention.

FIG. 22 shows a scanning optical apparatus according to the ninth embodiment of the present invention. The scanning optical apparatus of this embodiment comprises a light source unit 101 consisting of a semiconductor laser array, a rotary polygonal mirror 103, a motor 104 for driving the polygonal mirror 103, a scanning lens system 105, a photosensitive drum 106, a spot position detector 107, a detection signal processing circuit 108 for processing an electrical signal from the spot position detector 107, and a control circuit 109 for supplying a control signal to the light source unit 101 in accordance with a signal output from the detection signal processing circuit 108.

Plural lines of laser elements in the semiconductor laser array in the light source unit 101 are arranged in the sub scanning direction. Plural lines of light-receiving elements for spot position detection in the spot position detector 107 are arranged in the sub scanning direction.

When an inclination of a reflecting surface of the rotary polygonal mirror is present, the scanning beam is scanned offset from the desired scanning line position, and a predetermined one of the plurality of light-receiving elements for spot position detection does not receive the scanning light.

When a scanning line positional error occurs, its shift amount is detected by a correspondence between the spot beam and one of the light-receiving elements which receives this spot beam. On the basis of this detection, an ON laser element is determined. In this embodiment, inclination correction of the scanning line cannot be performed, but scanning line correction whose error is caused by surface inclination of the polygonal mirror is effective.

According to the present invention, in a scanning optical apparatus for deflecting and scanning light beams emitted from a light source array having a plurality of light source elements by a rotary polygonal mirror, the light source elements of the light source array are ON/OFF-controlled in accordance with switching of reflecting surfaces of the polygonal mirror which receives the beam, thereby correcting a scanning line pitch error on a scanning medium.

The light source array is a semiconductor laser array.

The array direction of the light source elements is inclined at an angle with respect to the sub scanning direction.

A scanning optical apparatus according to the present invention comprises a light source unit having a plurality of light-emitting elements, a scanning means for deflecting the beams from the light source unit and scanning a scanning surface of the beams, a detecting means for detecting scanning positions of the beams scanned on the scanning surface, and a control means for controlling the light source unit on the basis of signals output from the detecting means.

As described above, with the arrangement of the scanning optical apparatus according to the present invention, the light source array such as a semiconductor laser array consisting of light source elements having a high response speed, e.g., semiconductor laser elements is selectively turned on in correspondence with positional errors occurring during scanning, thereby correcting scanning line pitch errors. Therefore, a rotationally symmetrical lens can be used as an optical system, and a response speed can be increased, thereby obtaining a low-cost, high-speed product.

What is claimed is:

1. A scanning optical apparatus comprising:
   a light source unit;
   scanning means for scanning a scanned surface with a beam from said light source unit;
   dividing means, disposed between said scanning means and said scanned surface, for dividing a part of the beam to be scanned on said scanned surface into a divided beam;
   detecting means having a plurality of detecting elements provided in a scanning direction of the beam and extending by a length corresponding to an effective scanning length of the beam to be scanned on said scanned surface, said detecting means for detecting the divided beam; and
   control means for controlling the beam scanned on the scanned surface in a subscanning direction perpendicular to the scanning direction on the basis of signals output from said plurality of detecting elements.

2. A scanning optical apparatus according to claim 1, further comprising second control means for controlling the light condensing position of the beam scanned by said scanning means on the basis of a signal output from said detecting means.

3. A recording apparatus comprising:
   a light source unit;
   a recording medium;
   scanning means for scanning said recording medium with a light beam from said light source unit;
   dividing means, disposed between said scanning means and said recording medium, for dividing a part of the light beam to be scanned on said recording medium into a divided beam;
   detecting means for detecting the divided light beam, said detecting means having a plurality of detecting elements provided in a scanning direction of the light beam and extending by a length corresponding to an effective scanning length of the light beam scanned on the recording medium; and
   control means for controlling the light beam while the light beam is being scanned on said recording medium in a subscanning direction perpendicular to the scanning direction on the basis of signals output from said plurality of detecting elements.

4. A recording apparatus according to claim 3, further comprising second control means for controlling the condensing position of the light beam scanned by said scanning means on the basis of a signal output from said detecting means.

5. A method for adjusting a scanning position of a light beam in a scanning optical apparatus, said method comprising the steps of:

scanning a surface of a recording medium with the light beam;

dividing a part of the light beam scanned on the surface of the recording medium into a divided beam;

detecting the divided light beam by a plurality of detecting means arranged in the scanning direction of the light beam and extending by a length corresponding to an effective scanning length of the light beam scanned on the recording medium; and controlling the light beam while the light beam is being scanned on the surface of the recording medium in a subscanning direction perpendicular to the scanning direction on the basis of a signal output from said plurality of detecting means.

6. A method according to claim 5, further comprising the step of controlling the light condensing position of the light beam scanned in said scanning step on the basis of a signal detected in said detecting step.

* * * * *